United States Patent
Nagate et al.

[11] Patent Number: 6,047,460
[45] Date of Patent: Apr. 11, 2000

[54] METHOD OF PRODUCING A PERMANENT MAGNET ROTOR

[75] Inventors: Takashi Nagate; Akihito Uetake; Yoshihiko Yamagishi, all of Nagano, Japan

[73] Assignee: Seiko Epson Corporation, Nagano, Japan

[21] Appl. No.: 08/863,417

[22] Filed: May 27, 1997

Related U.S. Application Data

[62] Division of application No. 08/590,466, Jan. 23, 1996, abandoned.

[51] Int. Cl.[7] .................................................. H02K 15/03
[52] U.S. Cl. ........................... 29/598; 29/596; 205/137; 205/152
[58] Field of Search ...................... 29/598, 596; 310/156, 310/216, 217, 261, 42; 205/80, 89, 137, 152, 119; 204/269, 224 R, DIG. 7

[56] References Cited

U.S. PATENT DOCUMENTS

| | | | |
|---|---|---|---|
| 3,878,718 | 4/1975 | Sugiyama et al. | 73/231 R |
| 3,989,604 | 11/1976 | Austin | 204/28 |
| 4,188,555 | 2/1980 | Suzuki et al. | 310/162 |
| 4,205,430 | 6/1980 | Jaffe | 29/596 |
| 4,325,757 | 4/1982 | Jandeska, Jr. et al. | 148/103 |
| 4,377,461 | 3/1983 | Lovejoy | 204/198 |
| 4,559,463 | 12/1985 | Kobayashi | 310/156 |
| 4,568,846 | 2/1986 | Kapadia | 310/156 |
| 4,569,730 | 2/1986 | Killer | 204/24 |
| 4,772,361 | 9/1988 | Dorsett et al. | 204/28 |
| 4,893,044 | 1/1990 | Bush et al. | 310/261 |
| 4,939,398 | 7/1990 | Lloyd | 310/156 |
| 4,969,529 | 11/1990 | Hamamura et al. | 427/131 |
| 5,082,745 | 1/1992 | Ohashi | 428/552 |
| 5,084,153 | 1/1992 | Mosse et al. | 204/228 |
| 5,097,166 | 3/1992 | Mikulic | 310/156 |
| 5,160,447 | 11/1992 | Ishikawa et al. | 252/62.54 |
| 5,369,325 | 11/1994 | Nagate et al. | 310/156 |
| 5,463,262 | 10/1995 | Uchida | 310/156 |
| 5,508,611 | 4/1996 | Schroeder et al. | 324/252 |
| 5,545,266 | 8/1996 | Hirosawa et al. | 148/302 |
| 5,631,093 | 5/1997 | Perry et al. | 428/611 |

*Primary Examiner*—Lee Young
*Assistant Examiner*—Davide Caputo
*Attorney, Agent, or Firm*—Kanesaka & Takeuchi

[57] ABSTRACT

A method of manufacturing a permanent magnet rotor comprising a rotor yoke (2) of a rotor (1) which is formed by laminating a large number of steel sheets (4), (14), (24), (34) and (44), has 2n times (n is a positive integer) of magnetic poles (5) on the outer periphery, has slots (6) at the bases of all or every other magnetic poles at a substantially equal distance from a rotatable shaft hole (7), and has permanent magnets (3) for a field inserted into the slots, and a method for producing it. It has a structure that the permanent magnets for the field are prevented from coming out, or the permanent magnets for the field have their faces treated in order to improve the safety and reliability of the permanent magnet rotor.

2 Claims, 25 Drawing Sheets

(a)

(b)

(c)

METHOD OF PRODUCING A PERMANENT MAGNET ROTOR

This application is a division of application Ser. No. 08/590,466, filed Jan. 23, 1996, now abandoned.

BACKGROUND ART

Generally, permanent magnet rotors have permanent magnets for a field and a yoke for forming magnetic paths, and are formed by inserting the permanent magnets for the field into slots formed in the yoke.

FIG. 25 shows a conventional permanent magnet rotor in an exploded state. A conventional permanent magnet rotor 221 has a yoke 222 and permanent magnets 223 for a field. The yoke 222 is formed by laminating a large number of silicon steel sheets 224. The yoke 222 has magnetic poles 225 formed on the outer periphery. At the bases of the magnetic poles 225, slots 226 are respectively formed at the same distance from a rotatable shaft 230 to insert the permanent magnets 223 for the field. Besides, each silicon steel sheet 224 is pressed to form caulking sections 227 recessed at equal intervals. The silicon steel sheets 224 are integrally laminated by mutually press-fitting the caulking sections 227.

The permanent magnets 223 for the field are formed to a size capable of being housed in the slots 226. In assembling the permanent magnets 223 for the field, the yoke 222 is shrinkage-fitted to the rotatable shaft 230, when a temperature of the yoke 222 is lowered, an adhesive is applied to the surfaces of the permanent magnets 223 for the field, which are then inserted in the slots 226 with their same magnetic poles opposed to each other as shown in the drawing. Arrow Q in the drawing indicates the direction that the permanent magnets 223 for the field are inserted.

On the other hand, for the permanent magnet rotor 221 which cannot use an adhesive because of its application conditions, the permanent magnets 223 for the field are formed so as to be fitted in the slots 126 without leaving any gap. When a temperature of the yoke 222 is lowered, the permanent magnets 223 for the field are pushed in the direction Q shown in the drawing by a pneumatic device so as to be forced into the slots 226. In addition, a non-magnetic balance weight 231 having the same diameter as the maximum diameter of the yoke 222 is press-fitted and fixed to the rotatable shaft at one end of the yoke 222.

But, in the above conventional permanent magnet rotor which uses the adhesive to be applied to the outer periphery of the permanent magnets for the field and inserts them into the slots of the yoke, the magnetized permanent magnets for the field are difficult to be inserted into the slots because they are attracted by the magnetic rotatable shaft, and the magnetized permanent magnets for the field are inserted with N and S poles in wrong directions.

And, there is a problem that when the permanent magnet rotor is operated in a refrigerant or pressurizing fluid, the adhesive is dissolved with the refrigerant or pressurizing fluid and the permanent magnets for the field come out.

And, to fix the balance weight to the end of the yoke, it is generally fixed to the rotatable shaft, but a delicate press-fitting size is required between the balance weight and the rotatable shaft because the balance weight has the shape of a fan. When the balance weight is fixed to the rotatable shaft, since the balance weight has a shape to cover the maximum outer diameter of the yoke, the passage of the refrigerant between magnetic poles is interrupted, and it is necessary to dispose the refrigerant passage at another position, e.g., the outer diameter of the stator. Besides, the balance weight can be fixed only after fixing the yoke to the rotatable shaft.

On the other hand, in the conventional permanent magnet rotor which directly forces the permanent magnets for the field into the slots of the yoke without using an adhesive, a large force is used to press-fit the permanent magnets for the field, and this force sometimes breaks the permanent magnets for the field.

And, the above permanent magnet rotor is required to have a high processing precision for fitting the permanent magnets for the field in the slots of the yoke in view of a dimensional consistency, making it difficult to produce the permanent magnet rotor.

Furthermore, to press-fit the surface-treated (plated) permanent magnets for the field into the yoke, plating is removed. As a result, there are disadvantages that fixing strength is lowered, and rust occurs.

In view of the above, a first object of this invention is to provide a permanent magnet rotor which prevents the permanent magnets for the field from falling out due to a refrigerant or pressurizing fluid and can be produced easily.

As to a compressor, technology is generally known that a drive motor and a compression device are disposed in series within a sealed vessel in which a refrigerant and an oil flow, and permanent magnets for a field are inserted into a rotor of the drive motor.

FIG. 26 is a longitudinal sectional view showing a conventional refrigerating cycle compressor. This refrigerating cycle compressor which is wholly designated by reference numeral 500 is provided with a sealed vessel 510 in which a refrigerant flows. The vessel 510 includes a compression device (not shown) and a drive motor 520 which are vertically disposed in series.

The drive motor 520 comprises a rotor 700, a stator 600 and a drive shaft 710. The stator 600 comprises a stator core 610 and an exciting coil 620. The rotor 700 includes a rotor yoke 720, permanent magnets 730 for a field, a spacer 740 and a balancer 750. The rotor yoke 720 is formed by laminating a large number of silicon steel sheets 760. The rotor yoke 720 has magnetic poles 770 on its outer periphery, and the magnetic poles 770 have at their bases slots 780 for inserting the permanent magnets 730 for the field.

The permanent magnets 730 for the field are formed into a size so as to be inserted into the slots 780, and their surfaces are not treated.

To assemble a refrigerating cycle compressor, the rotor yoke 720 is shrinkage fitted to the drive shaft 710 which is previously disposed within the sealed vessel 510. Specifically, the rotor yoke 720 is heated to about 450° C. to expand a rotatable shaft hole at the center so as to have a slightly large diameter and fitted to the rotatable shaft 710 while it is still hot. When the rotor yoke 720 is cooled, the expanded rotatable shaft hole contracts, and its through hole tightly holds the rotatable shaft 710. When the compressor is used, a temperature of the compressor rises to about 130° C., but since the rotatable shaft 710 is also expanded, the holding of the rotatable shaft 710 by the rotor yoke 720 is not lowered.

And, the permanent magnets 730 for the field are inserted into the rotor yoke 720. Specifically, after cooling the rotor yoke 710, the permanent magnets 730 for the field which are not magnetized nor surface-treated and wrapped in rust preventive paper are inserted into the slots 780. And, after inserting the permanent magnets 730 for the field, the non-magnetic spacer 740 is press-fitted to the end of the rotor yoke 720 to fix the permanent magnets for the field in the axial direction, and the magnetic balance weight 750 for keeping a dynamic balance of the compression device is press-fitted to about the end of the spacer 740. In the drawing, arrow Q indicates the direction that the permanent magnets 730 for the field are inserted.

After fitting the above components, a lid (not shown) of the sealed vessel 510 is closed, a high current is applied to the exciting coil 620, the rotatable shaft 710 is locked, the permanent magnets 730 for the field are magnetized, and hot air is blown to dry the interior of the sealed vessel 510 to evaporate moisture.

Since the above prior art inserts the permanent magnets for the field whose surfaces are not treated into the slots of the rotor yoke, it is rather difficult to prevent the occurrence of rust until the permanent magnets for the field are fitted, and even after inserting into the slots, since a refrigerant and an oil are pressurized to flow within a pressure container where a motor operates, there is a disadvantage that they may penetrate into the interior of the material for the permanent magnets for the field to fuse the magnets.

In view of the above, it is recently known to treat the surfaces of the permanent magnets for the field which are used for the compressor. In this case, each magnet has its two opposite faces pinched by needle-shaped fixing electrodes, a current is passed to the electrodes, and the magnet is dipped to be nickel plated in a plating bath, but the parts of the magnet material which are in contact with the fixing electrodes are not plated, exposing the magnet material.

When the permanent magnets for the field which have been electrically nickel plated are inserted into the slots of the rotor yoke, it is necessary to apply a repairing material to the electrode marks to prevent rust from occurring on the electrode marks (the plating with the repairing material applied to the electrode marks will be hereinafter referred to as nickel plating with electrode marks), but even when repaired, there is a problem that the repairing material is dissolved into the refrigerant or oil. Furthermore, with a high temperature for the shrinkage fitting and the hot air drying, the repairing material is peeled easily due to a difference in expansion coefficient between the repairing material and the plating, and because of a heat resisting strength lowered due to a difference in material, the dimensional management of the magnets including the repaired parts is difficult.

In addition, since the nickel plating with electrode marks using the fixed electrodes concentrates a plating current to the ends of the permanent magnets for the field, the ends generally tend to have thicker plating than the center (20 $\mu$m to 50 $\mu$m), making it difficult to manage the thickness size, and when the plated film becomes thick, a residual stress in the film increases to cause a disadvantage of deteriorating the adhesion.

On the other hand, without using the above electroplated permanent magnets for the field, there is a case of inserting electroless plated permanent magnets for a field into a rotor yoke. In this case, the electroless plated permanent magnets for the field are separately heated, the rotor yoke is shrinkage fitted to the rotatable shaft, then the heated permanent magnets for the field are inserted into the slots of the rotor yoke. To use the electroless plated permanent magnets for the field, there are disadvantages that a process takes a long time and it is difficult to fix the magnets because three steps are adopted for the thermal treatment of the electroless plated permanent magnets for the field, the shrinkage fitting of the rotor yoke to the rotatable shaft, and the insertion of the permanent magnets for the field into the slots of the rotor yoke.

A second object of the invention is to provide a permanent magnet rotor and its production method in which electroplated permanent magnets for a field and electroless plated permanent magnets for a field improve a permanent magnet rotor inserted into the slots of a rotor yoke and its production method; when the electroplated permanent magnets for the field are used, the plating is substantially uniform at the center and ends of the permanent magnets for the field and does not have an electrode mark; and the process can be simplified and the production time can be shortened, which are also applied to the electroless plated permanent magnets for the field.

SUMMARY OF THE INVENTION

The invention of claim 1 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein the each steel sheet is formed into the same shape, each slot of the steel sheet is formed into a size matching the permanent magnet for the field, and a single or a plurality of slots are formed at a distance different from other slots from the rotatable shaft hole, and at least one of steel sheets at the ends of the yoke is disposed with a phase of the slot position changed with respect to other laminated steel sheets, and the permanent magnets for the field are prevented from coming out of the slots by means of the steel sheet provided with the slots having a different phase.

The invention of claim 2 is a permanent magnet rotor according to the invention of claim 1, wherein the each steel sheet has slots on all magnetic poles, slots on the magnetic poles with a couple of N poles or a couple of S poles are at the same distance from the rotatable shaft hole and slots on the magnetic poles with N and S poles have a different distance from the rotatable shaft hole, and at least one of the steel sheets at the ends of the yoke is disposed turned by (360°/2n) with respect to the other laminated steel sheets.

The invention of claim 3 is a permanent magnet rotor according to the invention of claim 1, wherein the each steel sheet has slots on all magnetic poles, slots on the magnetic poles with a couple of N poles or a couple of S poles are at a different distance from the rotatable shaft hole and a pair of slots on the magnetic poles with N and S poles have the same distance from the rotatable shaft hole, and at least one of the steel sheets at the ends of the yoke is disposed turned by (720°/2n) with respect to the other laminated steel sheets.

The invention of claim 4 is a permanent magnet rotor according to the invention of claim 1, wherein the each steel sheet has slots on all magnetic poles, the slots on all the magnetic poles have a different distance from the rotatable shaft hole, and at least one of the steel sheets at the ends of the yoke is disposed turned by (360°×m/2n, where m is an integer of 1 to n) with respect to the other laminated steel sheets.

The invention of claim 5 is a permanent magnet rotor according to the invention of claim 1, wherein the each steel sheet has a slot on every other magnetic pole, the slots on the magnetic poles with a couple of N poles or a couple of S poles are at the same distance from the rotatable shaft hole, and at least one of the steel sheets at the ends of the yoke is disposed turned by (360°/2n) with respect to the other laminated steel sheets.

The invention of claim 6 is a permanent magnet rotor according to the invention of claim 1, wherein the each steel sheet has a slot on every other magnetic pole, slots on a certain magnetic pole and a magnetic pole separated from the former magnetic pole by (n−2) have the same distance from the rotatable shaft hole, and at least one of the steel sheets at the ends of the yoke is disposed turned by (360°/2n) with respect to the other laminated steel sheets.

The invention of claim 7 is a permanent magnet rotor according to the invention of claim 1, wherein the each steel sheet has a slot on every other magnetic pole, the slots on all the magnetic poles have a different distance from the rotatable shaft hole, and at least one of the steel sheets at the ends of the yoke is disposed turned by (360°×m/2n, where m is an integer of 1 to n) with respect to the other laminated steel sheets.

The invention of claim 8 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein the each permanent magnet for the field is formed into the same shape and have one or a plurality of slopes in the longitudinal direction, the each steel sheet is formed into the same shape, each slot of a single steel sheet is formed into a size matching the permanent magnet for the field, and a single or a plurality of slots are formed to have a different position for slopes corresponding to the above slopes of the permanent magnets for the field, and at least one of steel sheets at the ends of the yoke is disposed with a phase of the slot position changed with respect to other laminated steel sheets, and the permanent magnets for the field are prevented from coming out of the slots by means of the steel sheet provided with the slots having a different phase.

The invention of claim 9 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein distances of the slots from the rotatable shaft hole are different between different poles, and a permanent magnet for a field having a weak coercive force is inserted into the slots positioned away from the rotatable shaft hole.

The invention of claim 10 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein distances of the slots from the rotatable shaft hole are different between different poles, and a slot identification mark is made on either of a slot which is positioned away from or a slot which is positioned near the rotatable shaft hole.

The invention of claim 11 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein distances of the slots from the rotatable shaft hole are equal to that of one of adjacent slots from the rotatable shaft hole but different from that of slots opposed to each other with the rotatable shaft hole between them from the rotatable shaft hole, a slot identification mark is made on either of a slot which is positioned away from or a slot which is positioned near the rotatable shaft hole, at least one end of the yoke has the steel sheet fitted turned by 90 or 180 degrees, and the slots of the above turned steel sheet have a shape different from the slots of the other steel sheets to prevent the permanent magnets for the field from coming out of the slots.

The invention of claim 12 is a permanent magnet rotor having a yoke of a rotor which has a large number of steel sheets laminated, four magnetic poles on the outer periphery and slots for inserting a permanent magnet for a field therein at the bases of the magnetic poles, wherein at least one end of the yoke has the steel sheet fitted turned by 90 or 180 degrees, and the above turned steel sheet is formed with one or both of (1) slopes of the side walls of the slot and (2) a distance of the slot from the rotatable shaft hole differentiated with respect to the adjacent magnetic poles or opposed magnetic poles to prevent the permanent magnets for the field from coming out of the slots.

The invention of claim 13 is a permanent magnet rotor having a yoke of a rotor which has a large number of steel sheets laminated, four magnetic poles on the outer periphery and slots for inserting a permanent magnet for a field therein at the bases of the magnetic poles, wherein a distance of the slots from a rotatable shaft hole is set to be $(|F-E|) \geq H$ (E or F is a distance between each slot and the rotatable shaft hole, and H is a difference between the slot thickness and the magnet thickness), and at least one end of the yoke has the steel sheet fitted turned by 90 or 180 degrees, and the slots of the above turned steel sheet have a shape different from the slots of the other steel sheets to prevent the permanent magnets for the field from coming out of the slots.

The invention of claim 14 is a permanent magnet rotor having a yoke of a rotor which has a large number of steel sheets laminated, four magnetic poles on the outer periphery and slots for inserting a permanent magnet for a field therein at the bases of the magnetic poles, wherein at least one end of the yoke has a balance weight, the center of the outer diameter of the balance weight is disposed inside the outer diameter of recesses of the yoke, both ends of the outer diameter of the balance weight are overlaid on the leading ends of the magnetic poles, the balance weight is at least 1 mm away from the end of the yoke, and preferably at least 2 mm away from the end.

The invention of claim 15 is a permanent magnet rotor according to the invention of claim 14, wherein the balance weight is made of a magnetic material, and the balance weight is in contact with the end of the yoke from the rotatable shaft hole to the slots and not in contact with the end of the yoke in the radial direction from the slots and provided with a stepped portion.

The invention of claim 16 is a permanent magnet rotor having a yoke of a rotor which has a large number of steel sheets laminated, four magnetic poles on the outer periphery and slots for inserting a permanent magnet for a field therein at the bases of the magnetic poles, wherein the steel sheets have a pair of caulkings opposed with a rotatable shaft hole therebetween in two pairs or at four positions, angles between the caulkings are determined to be A and B, A+B is determined to be 180 degrees (A≠B), and at least one end of the yoke has the steel sheet fitted turned by 180 degrees, and the above turned steel sheet has (1) the shape of slots and (2) a distance of the slots from the rotatable shaft hole differentiated from the other steel sheets to prevent the permanent magnets for the field from coming out of the slots.

The invention of claim 17 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein the slots are formed thicker to make a difference between the thickness around the edges of the slots and the thickness around the edges of the permanent magnet for the field to be 0.01 to 0.3 mm.

The invention of claim 18 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein to fit the rotor yoke to a rotatable shaft, the rotor yoke is heated, the heated rotor yoke is fitted to the rotatable shaft, the permanent magnets for the field are inserted into the slots while the slots are expanded by heating, and the permanent magnets for the field are fixed by the slots when the rotor yoke is cooled and contracted.

The invention of claim 19 is a production method for a permanent magnet rotor according to the invention of claim 18, wherein the slots have at their both ends a bridge for connecting the leading end and base of each magnetic pole, and the permanent magnet for the field is fixed to at least part of the bridges.

The invention of claim 20 is a permanent magnet rotor having a yoke of a rotor which has a large number of steel sheets laminated, has 2n times (n is a positive integer) of magnetic poles on the outer periphery, and has slots for inserting a permanent magnet for a field therein at the bases of all or every other magnetic poles at a substantially equal distance from a rotatable shaft hole, wherein the slots have at their both ends a bridge for connecting the leading end and base of each magnetic pole, the rotor yoke is made of at least two types of steel sheet which have bridges in different shapes, and the permanent magnets for the field are fixed by a part of the bridge of the at least one type of steel sheet.

According to one aspect of the invention, there is provided a production method for a permanent magnet rotor having a yoke of a rotor which has a large number of steel sheets laminated, has 2n times (n is a positive integer) of magnetic poles on the outer periphery, has slots for inserting an electroplated permanent magnet for a field therein at the bases of all or every other magnetic poles at a substantially equal distance from a rotatable shaft hole, wherein to fit the rotor yoke to a rotatable shaft, rare earth permanent magnets for a field are inserted into the slots of the rotor yoke, the rotor yoke is heated at a temperature between a temperature or above a curie temperature of the permanent magnet for the field and below a temperature for retaining the performance of the material for the permanent magnet for the field, the rotor yoke is fitted to the rotatable shaft, then magnetization is made.

According to another aspect of the invention, there is provided a production method for a permanent magnet rotor having a yoke of a rotor which has a large number of steel sheets laminated, has 2n times (n is a positive integer) of magnetic poles on the outer periphery, has slots for inserting an electroless nickel plated permanent magnet for a field to be used in a refrigerant therein at the bases of all or every other magnetic poles at a substantially equal distance from a rotatable shaft hole, wherein the permanent magnet for the field is a rare earth magnet, and the nickel plating is thermally treated after inserting the electroless nickel plated permanent magnets for the field into the slots of the rotor yoke.

BEST MODE FOR CARRYING OUT THE INVENTION

Embodiments of the invention will be described with reference to the accompanying drawings.

Figure 1:
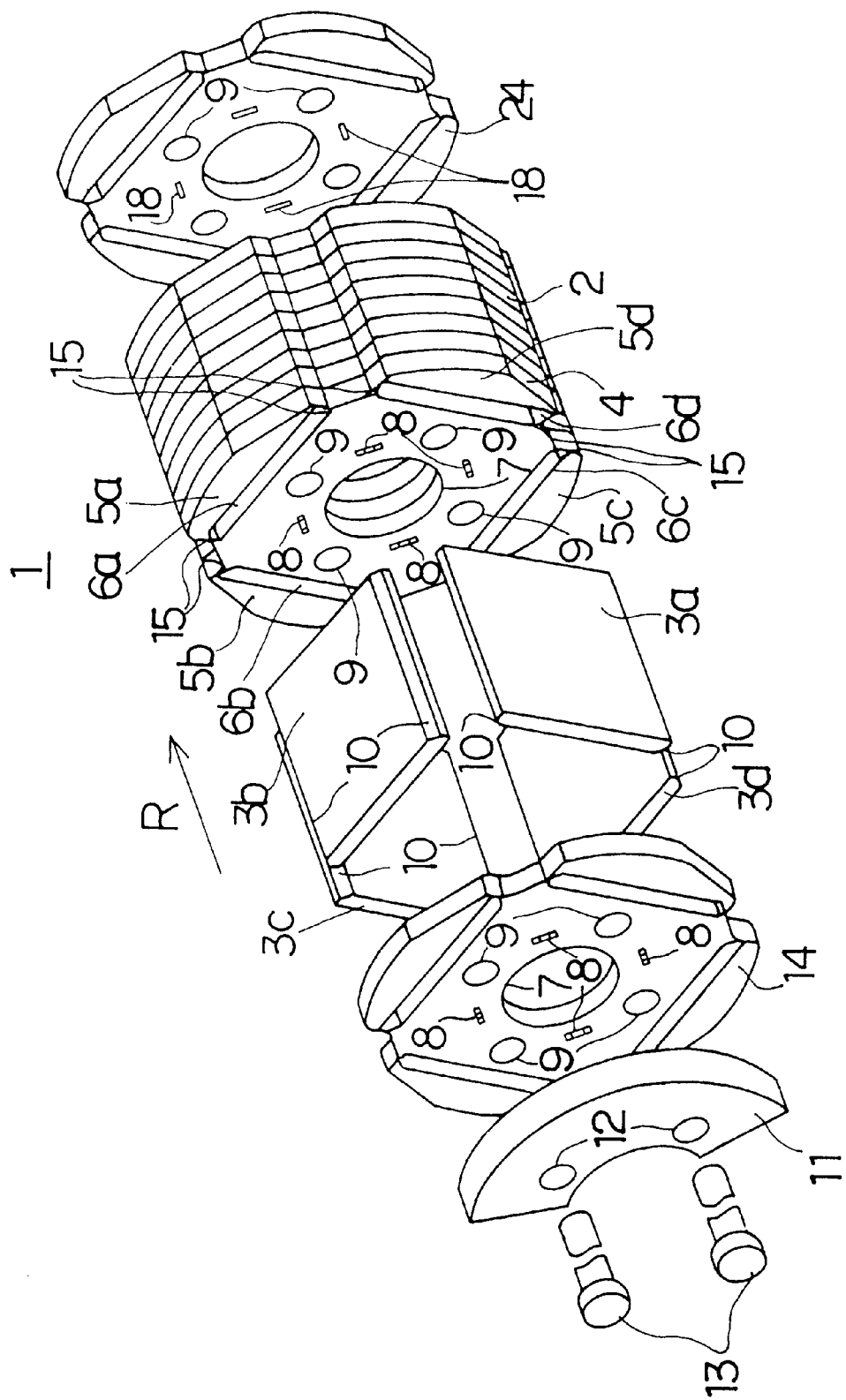
FIG. 1 is a perspective view showing a permanent magnet rotor of the invention in an exploded state.

FIG. 1 shows a permanent magnet rotor in an exploded state of this embodiment. A permanent magnet rotor 1 has a rotor yoke 2 and two pairs of plate permanent magnets 3a, 3b, 3c and 3d for a field. The rotor yoke 2 is formed by punching out many silicon steel sheets 4 by a die and laminating them into one body.

One end of the rotor yoke 2 is made of a silicon steel sheet 24 having the same shape with the silicon steel sheets 4. Specifically, one end of the rotor yoke 2 is made of the silicon steel sheet 24 which is turned by 90 degrees in a clockwise direction around a rotatable shaft hole 7 with respect to the silicon steel sheets 4. The rotor yoke 2 has four magnetic poles 5a, 5b, 5c and 5d protruded outward radially formed on the outer periphery. The magnetic poles 5a, 5b, 5c and 5d have at their bases two pairs of slots 6a, 6b, 6c and 6d for inserting the permanent magnets for the field.

Furthermore, at the center of the rotor yoke 2, the rotatable shaft hole 7 is formed to pass a rotatable shaft through it, and distances from the rotatable shaft hole 7 to the slots 6a, 6b, 6c and 6d are equal. Each silicon steel sheet 4 has its parts recessed to form caulking sections 8 at equal intervals, and the caulking sections 8 are mutually press-fitted to laminate the silicon steel sheets 4, 4 into one body. And, openings 9 are formed between the slots 6a, 6b, 6c and 6d and the rotatable shaft hole 7.

The permanent magnets 3a, 3b, 3c and 3d for the field are formed into a hexahedron having a rectangular cross section, a side slope 10 is formed to have the same inclination and same size on two edges with a larger area than on other edges. The slopes 10 are formed on the permanent magnets 3a, 3c for the field to face the rotatable shaft hole 7, and on the permanent magnets 3b, 3d for the field in a radial direction. In the same way, two slopes 15 are formed to have the same inclination and same size on the sides of the slots 6a, 6b, 6c and 6d so as to match the permanent magnets for the field.

The permanent magnets for the field are inserted into the slots 6a, 6b, 6c and 6d (in the direction R shown in the drawing), and the silicon steel sheets are integrally press-fitted by means of the caulking sections 8 with a silicon steel sheet 14, which is turned clockwise by 90 degrees around the rotatable shaft hole 7, overlaid to the silicon steel sheets 4. Then, a balance weight 11 is fitted with openings 12 of the balance weight 11 aligned with the holes at the end of the rotor yoke 2, non-magnetic rivets 13 which are longer than the rotor yoke are inserted to pass through the silicon steel sheet 24, and 2 to 5 mm of the rivets projected from the silicon steel sheet 24 are smashed to fix the rivets. Thus, the rotor is fixed as a whole.

In this embodiment, at least one (silicon steel sheet 14) of the steel sheets at the ends of the rotor yoke 2 is positioned with a phase of the slot positions changed (90 degrees in the clockwise direction) with respect to the other laminated steel sheets (silicon steel sheets 4), and the steel sheet having the slots with a different phase prevents the permanent magnets for the field from coming out of the slots.

Description will be made of various embodiments to dispose the steel sheet on the ends of the rotor yoke with the phase of the slot positions changed with respect to the other laminated steel sheets to prevent the permanent magnets for the field from coming out of the slots.

When the steel sheet has a slot on all magnetic poles, (1) the slots on the magnetic poles with a couple of N poles or a couple of S poles are at the same distance from the rotatable shaft hole and the slots on the magnetic poles with N and S poles have a different distance from the rotatable shaft hole, and at least one of the steel sheets at the ends of the yoke is disposed turned by (360°/2n) with respect to the other laminated steel sheets.

(2) The slots on the magnetic poles with a couple of N poles or a couple of S poles are at a different distance from the rotatable shaft hole and a pair of slots on the magnetic poles with N and S poles have the same distance from the rotatable shaft hole, and at least one of the steel sheets at the ends of the yoke is disposed turned by (720°/2n) with respect to the other laminated steel sheets.

(3) The slots on all the magnetic poles have a different distance from the rotatable shaft hole, and at least one of the steel sheets at the ends of the yoke is disposed turned by (360°×m/2n, where m is an integer of 1 to n) with respect to the other laminated steel sheets.

When the steel sheet has a slot on every other magnetic pole, (1) the slots on the magnetic poles with a couple of N poles or a couple of S poles are at the same distance from the rotatable shaft hole, and at least one of the steel sheets at the ends of the yoke is disposed turned by (360°/2n) with respect to the other laminated steel sheets.

(2) The slots on a certain magnetic pole and a magnetic pole separated from the former magnetic pole by (n−2) have the same distance from the rotatable shaft hole, and at least one of the steel sheets at the ends of the yoke is disposed turned by (360°/2n) with respect to the other laminated steel sheets.

(3) The slots on all the magnetic poles have a different distance from the rotatable shaft hole, and at least one of the steel sheets at the ends of the yoke is disposed turned by (360°×m/2n, where m is an integer of 1 to n) with respect to the other laminated steel sheets.

Figure 2:
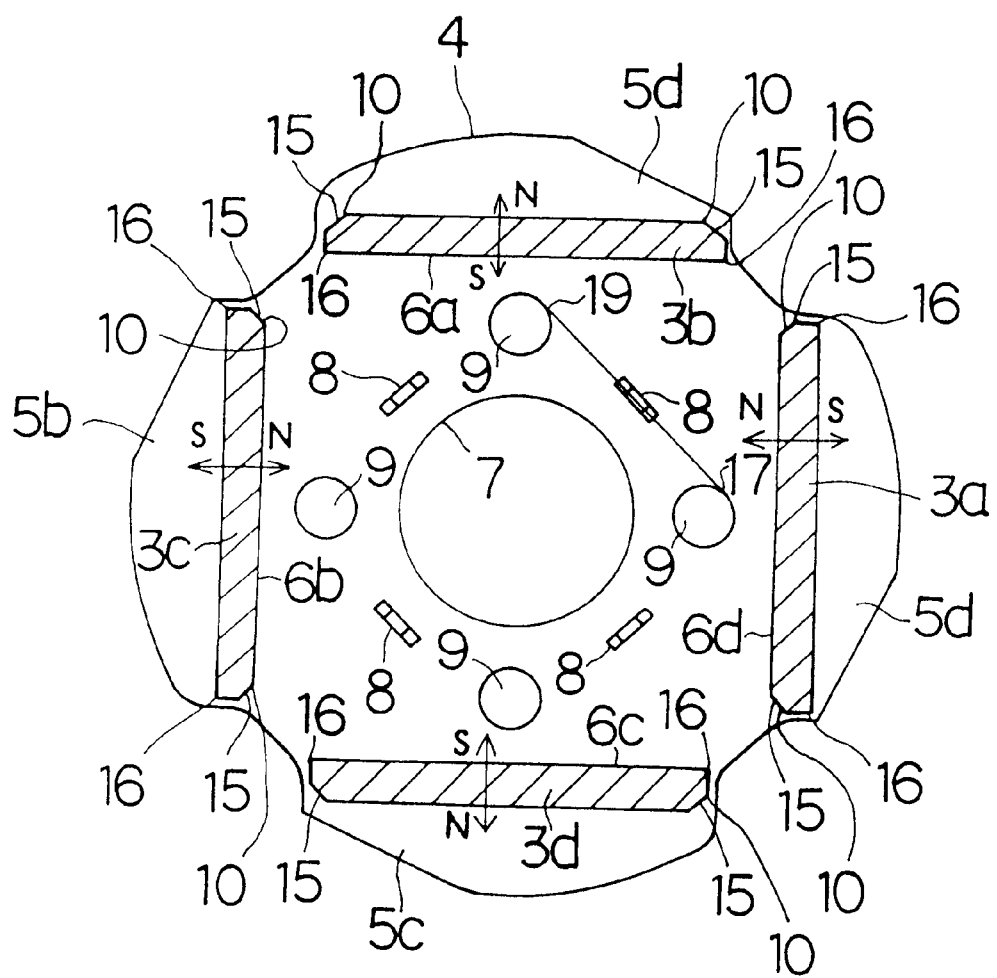
FIG. 2 is a sectional view of a permanent magnet rotor of the invention.

FIG. 2 shows a transverse sectional view of the silicon steel sheet 4 with the permanent magnets for the field inserted. The slots 6a, 6b, 6c and 6d are disposed at the bases of the magnetic poles 5a, 5b, 5c and 5d of the silicon steel sheet 4 at a substantially equal distance from the rotatable shaft hole 7 of the rotor yoke. The permanent magnets 3a, 3b, 3c and 3d for the field are respectively inserted in the slots 6a, 6b, 6c and 6d. The permanent magnets 3a, 3b, 3c and 3d for the field have a magnetic field magnetized in the radial direction.

And, the permanent magnets 3a, 3b, 3c and 3d have two large slopes 10 formed on the same face perpendicular to the direction of magnetic field. With the slopes 10 formed on the same face, when the angle of the slope of one permanent magnet for the field is changed, both sides of the permanent magnet for the field in the slot can be fixed easily because face-contact fixing is changed to point-contact fixing due to a difference between the side slope of the slot and the side slope angle of the permanent magnet for the field.

The slots 6a, 6c have two slopes 15 formed on their sides in the radial direction with the same inclination and size. The slopes 10 of the permanent magnets 3b, 3d for the field and the slopes 15 of the slots 6a, 6c are faced to the radial direction and disposed at the same position. And, when the permanent magnets 3b, 3d for the field are inserted into the slots 6a, 6c with the slopes 10 of the permanent magnets 3b, 3d for the field opposed to the radial direction, they are aligned to each other. At the time, the magnetic pole is N.

On the other hand, the slots 6b, 6d are provided with the slopes 15 in the same way on two positions of their sides to face the rotatable shaft hole 7. And, when the permanent magnets 3a, 3c for the field provided with the slopes 10 are inserted into the slots 6b, 6d to make the magnetic pole to be S, they are aligned to each other.

The slopes 10, 15 have a size half or below the thickness of the permanent magnets for the field. In this embodiment, other edges 16 are also provided with a slight slope, but the slopes 15 are largely inclined so that they can be distinguished in size of slopes.

Besides, the slopes 10 of the magnet and the slopes 15 of the slot are related as follows to allow smooth insertion of the permanent magnets for the field into the slots.

Side slope 10 ≧ side slope 15

The permanent magnets 3a, 3b, 3c and 3d for the field are arranged so that the outer periphery of the rotor yoke 2 is provided with alternate magnetism of N and S poles. In addition, the permanent magnets 6a, 6b, 6c and 6d for the field have the slopes 10 at the same position based on N and S poles and so can be produced from one type of magnet for the field. Therefore, the production is easy. And, to insert the permanent magnets for the field into the rotor yoke 2, they can be inserted into the slots without paying attention to N and S poles. It is convenient that the N and S poles are automatically disposed on the outer periphery of the rotor yoke.

Each silicon steel sheet has caulking sections 8 and can be fixed by press fitting the caulking sections 8. And, the openings 9 are formed between the permanent magnets 6a, 6b, 6c and 6d and the rotatable shaft hole 7. The openings 9 are positioned at the same distance from the rotatable shaft hole 7, and the caulking sections 8 are positioned on a tangent line 19-17 between the openings 9. And, the caulking sections 8 are preferably formed near the rotatable shaft hole 7 inside the tangent line 19-17, so that the magnetic flux of each permanent magnet for the field is not disturbed, a magnetic path is made short, a magnetic flux density is not increased, and a core loss of the silicon steel sheets can be suppressed small.

The space between the opening 9 and the permanent magnet for the field is desired to be smaller. Generally, the space between the opening 9 and the permanent magnet for the field is 0.3–5.0 mm, and desirably 0.3–0.5 mm, so that when the balance weight is fixed, the rotor is accurately balanced and the production is effected easily.

When the opening 9 is positioned at the center of the permanent magnet for the field, the magnetic flux within the rotor is not disturbed by the opening 9, and the core loss of the steel sheet can be suppressed to be small.

Figure 3:
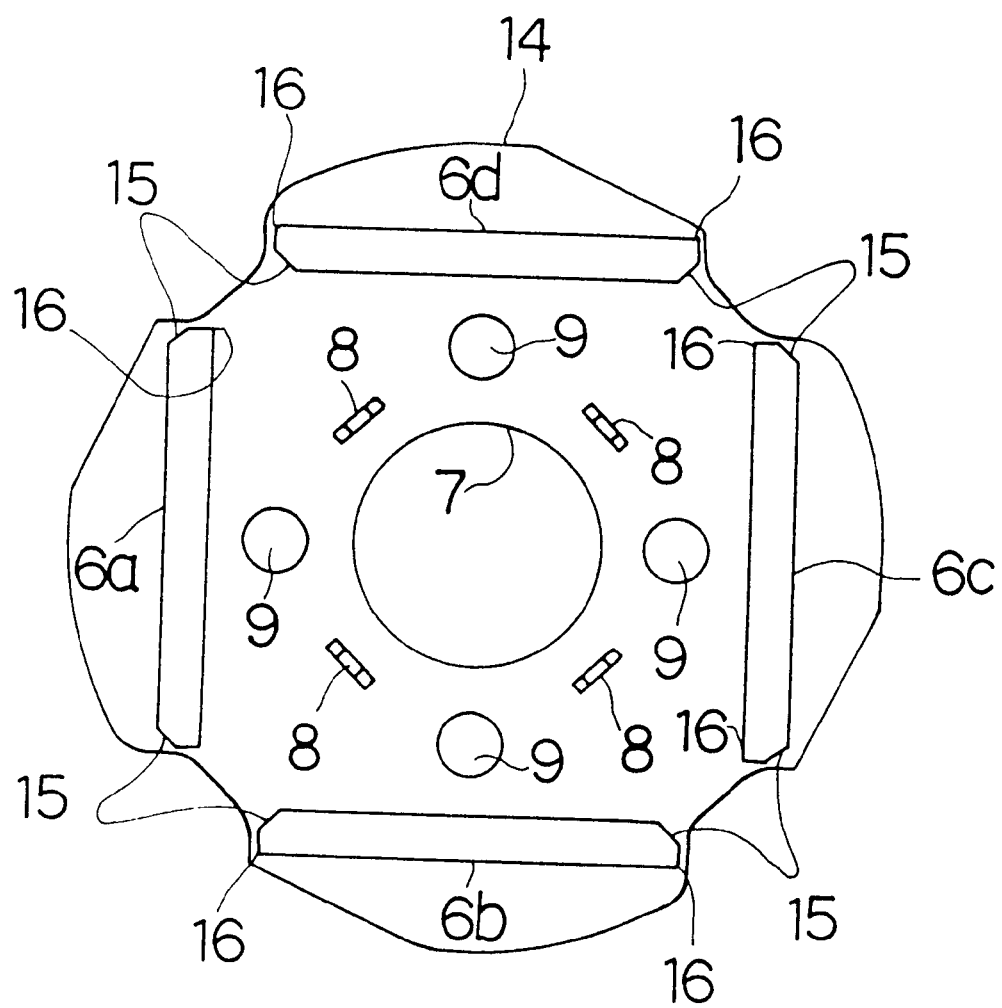
FIG. 3 is a sectional view showing a silicon steel sheet of the invention turned by 90 degrees.

FIG. 3 is a diagram showing a silicon steel sheet 14. The silicon steel sheet 14 is obtained by turning the silicon steel sheet 4 by 90 degrees around the rotatable shaft hole 7. The caulking sections 8 of the silicon steel sheet 14 are caulked with the caulking sections 8 of the silicon steel sheet 4. And, the slots 6a, 6c vertically positioned on the silicon steel sheet 4 are horizontally positioned on the silicon steel sheet 14 with the rotatable shaft hole 7 as the center, and the slots 6b, 6d horizontally positioned on the silicon steel sheet 4 are vertically positioned on the silicon steel sheet 14.

Figure 4:
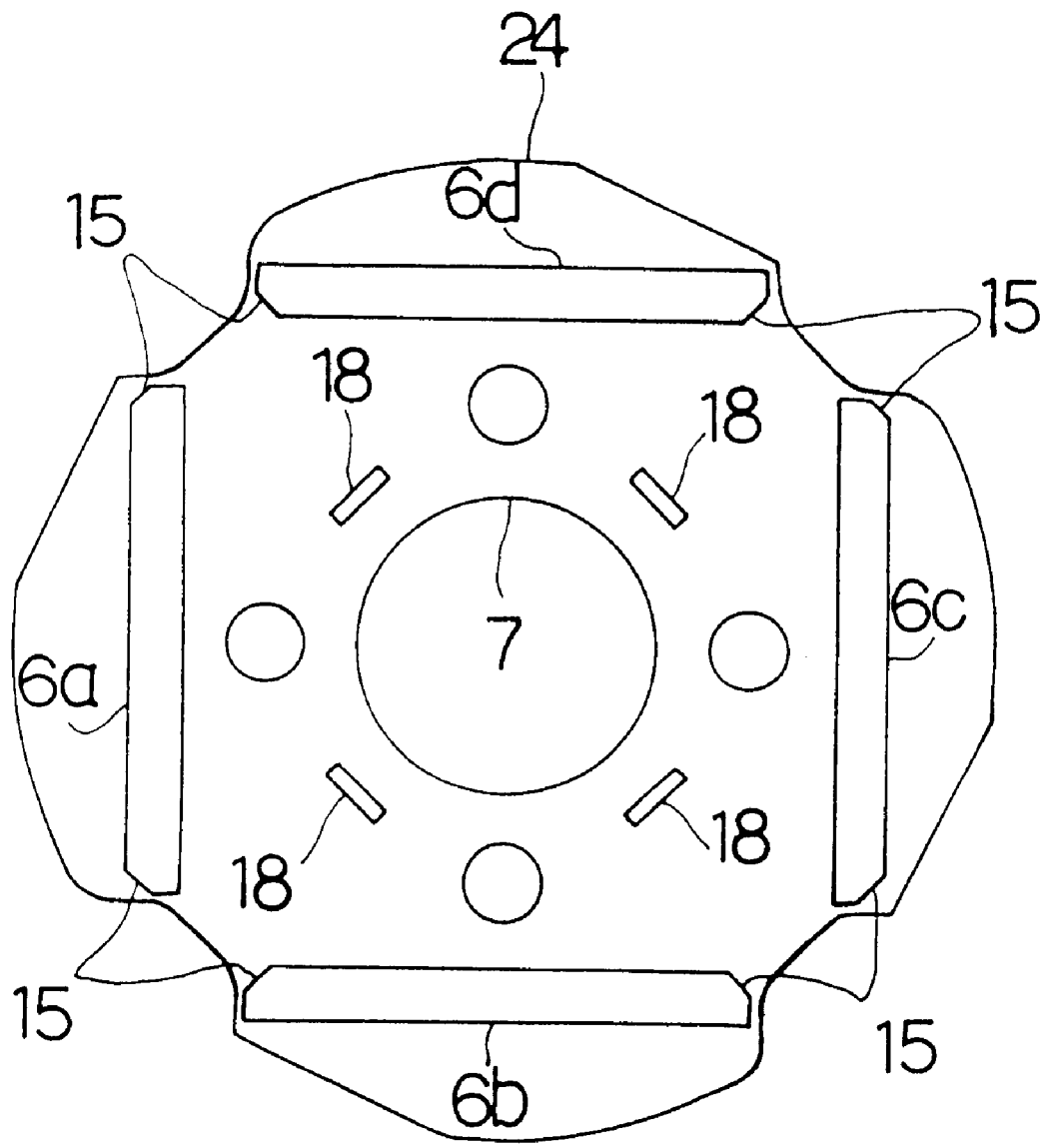
FIG. 4 is a sectional view showing a silicon steel sheet of the invention turned by 90 degrees.

FIG. 4 is a diagram showing a silicon steel sheet 24. The silicon steel sheet 24 is obtained by turning the silicon steel sheet 4 by 90 degrees around the rotatable shaft hole 7 and forming openings 18. The openings 18 are formed by punching out instead of the caulking sections 8 of the silicon steel sheet 4. The openings 18 are formed by lowering a die deeper when the silicon steel sheet is pressed by the die, so that the caulking sections are completely punched out as an opening. And, the caulking sections are formed by lowering the die shallower.

Figure 5:
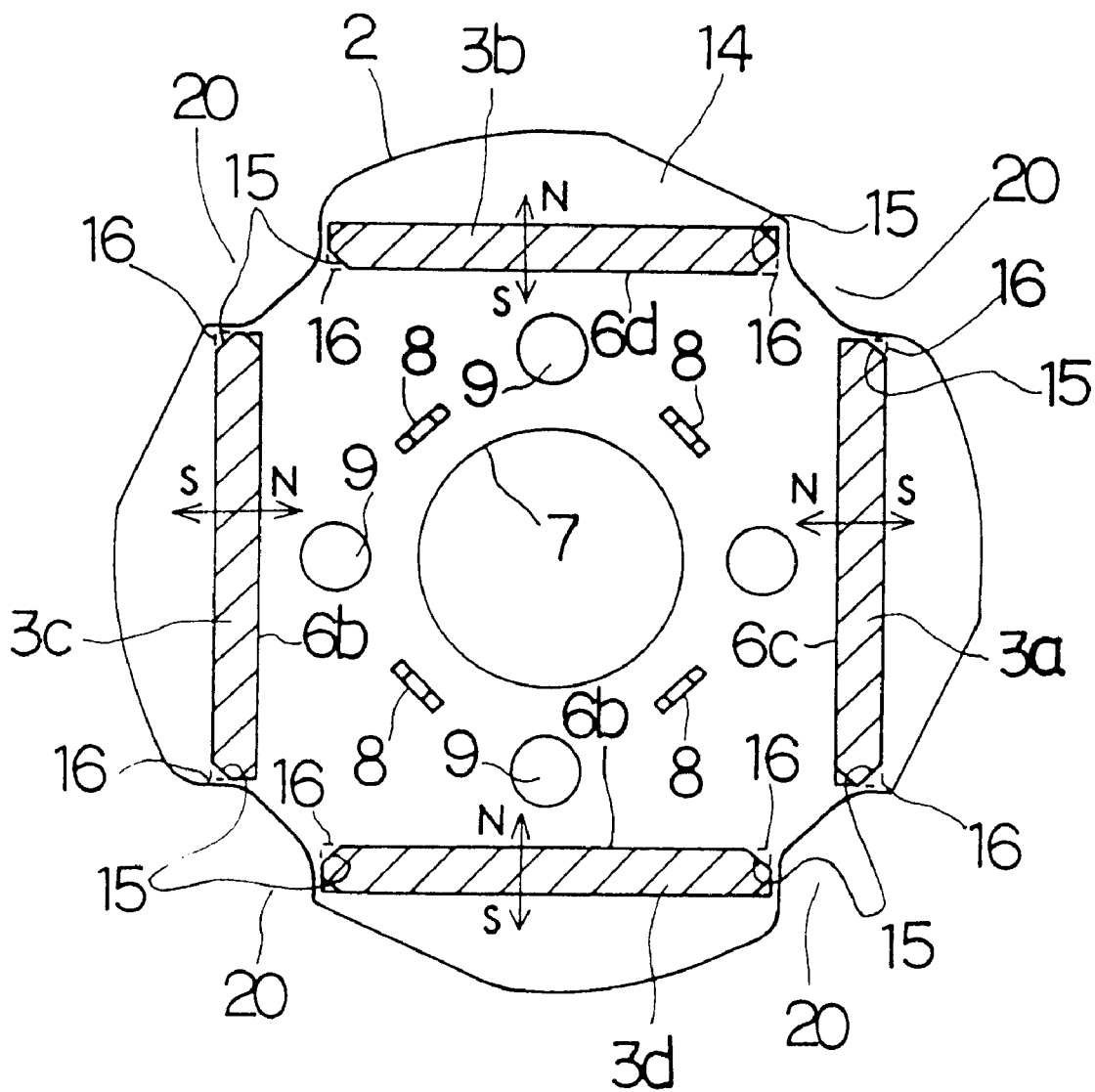
FIG. 5 is a sectional view showing a permanent magnet rotor of the invention.

FIG. 5 is a diagram showing that the silicon steel sheet 14 is caulked with the silicon steel sheet 4 from above.

The openings 9 of the silicon steel sheet 14 are formed to be through to allow the rivets even when the silicon steel sheets are laminated. To fix the permanent magnets 3a, 3b, 3c and 3d for the field in the axial direction, the side slopes 15 of the slots 6a, 6b, 6c and 6d are in contact with the side slopes 16 of the permanent magnets for the field in the axial direction, so that the permanent magnets for the field are fixed in the axial direction.

Therefore, an excess load is not applied to the slots. For instance, even when an adhesive for fixing the magnet is dissolved into a refrigerant or pressurizing fluid, the permanent magnets 3a, 3b, 3c and 3d for the field do not come out of the silicon steel sheet 14. Besides, the permanent magnets for the field can be fixed regardless of the worked precision of the permanent magnets for the field, and since the edges of the permanent magnets for the field are fixed, the area of the steel sheets in contact with the end faces of the permanent magnets for the field is small, so that magnetic fluxes do not leak in a large quantity and no other member is required for fixing.

In addition, since the magnetic fluxes do not leak in a large quantity, the motor performance is not degraded extensively. And, with the silicon steel sheet 14 placed on the silicon steel sheet 4, the outer periphery of the rotor yoke 2 is not deformed, and refrigerant passages 20 running the outer periphery of the rotor yoke are not disturbed, eliminating the necessity of providing an additional refrigerant passage on, e.g., the outer periphery of the stator.

Figure 6:
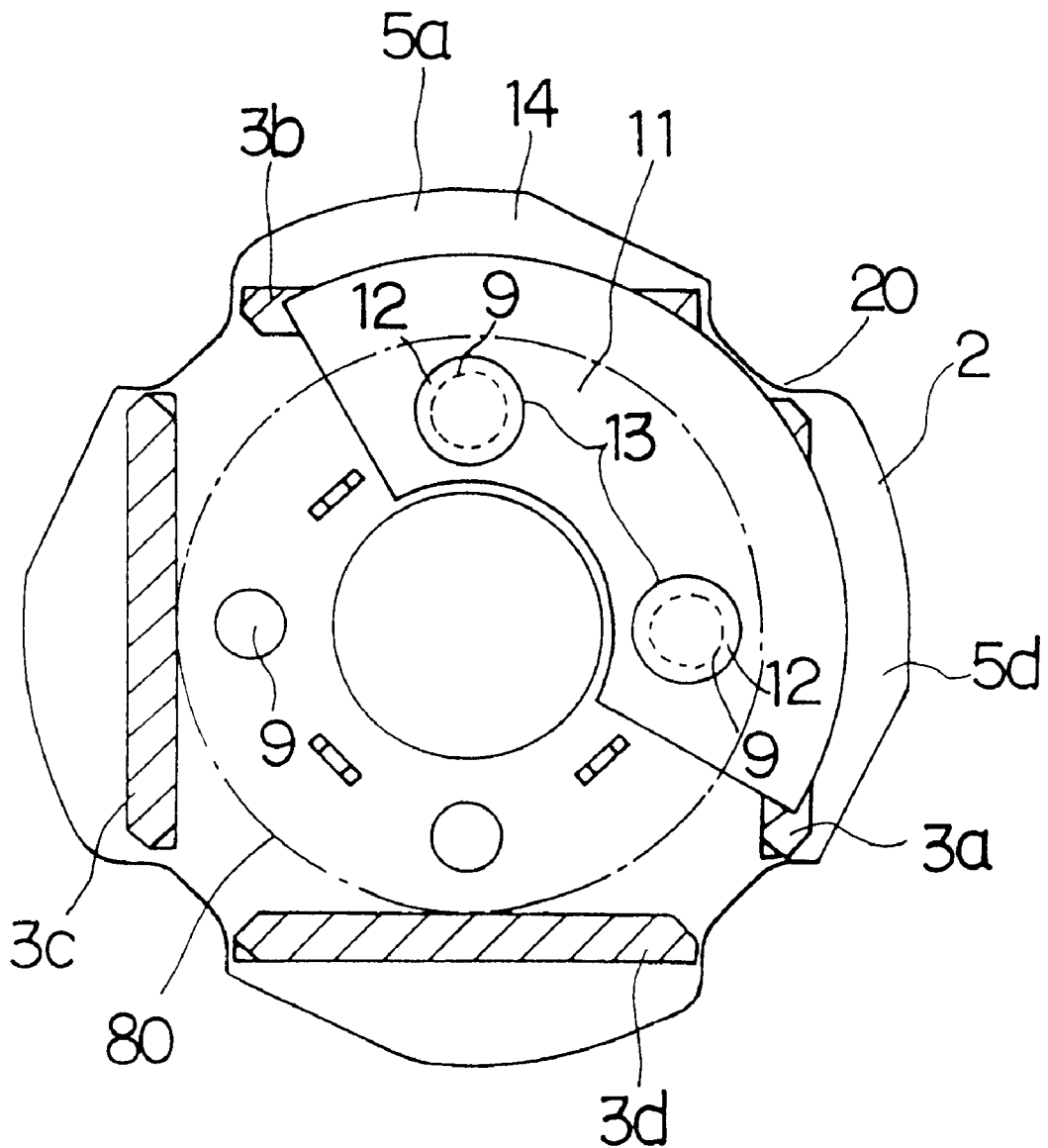
FIG. 6 is a sectional view showing a permanent magnet rotor of the invention.

FIG. 6 is a diagram showing that the balance weight 11 is caulked onto the silicon steel sheet 14 from above by means of rivets.

The openings 9 of the silicon steel sheet 14 are aligned with the openings 12 of the balance weight 11, and two non-magnetic rivets 13 are inserted into the openings to fix the balance weight 11. In this case, when the balance weight 11 is not magnetic, it is fixed in contact with the silicon steel sheet 14, but when the balance weight 11 is magnetic, magnetic fluxes are leaked between the permanent magnets 3a, 3b for the field because the ends of the permanent magnets for the field are covered, and the efficiency of a motor is lowered as follows.

Specifically, the relation between the efficiency of a motor and the distance from the end of the silicon steel sheet 14 to the magnetic balance weight 11 is as follows.

| Distance (mm) | Efficiency of motor (%) |
| --- | --- |
| 0 | 86.3 |
| 1 | 87.6 |
| 2 | 88.2 |
| 3 | 88.2 |
| 5 | 88.2 |

It is apparent from the above that the efficiency drop is decreased when the distance is 1 mm or more. It is preferable to separate 2 mm or more. When the balance weight has a shape to fall within a circumference 80 (between the slots having the same pole) indicated by a dash and dotted line, the balance weight is in contact with the end of the rotor yoke 2, and on the outside of the circumference 80, the same motor efficiency is attained for a so-called stepped balance weight which has a shape separated by the above distance from the end of the rotor yoke 2.

And, the openings 9 and the openings 12 are related in size as follows.

Opening 9<opening 12

The rivets 13 are also stepped to match the openings 9, 12. Particularly, when the rivets 13 are press-fitted into the openings 12, the rotor yoke 2 is improved in vibration balance.

On the other hand, in the case of using a non-magnetic balance weight, the openings 9 and 12 can be formed to have the same size, the balance weight 11 is air-tightly attached to the silicon steel sheet 14, and the outer periphery of the balance weight is overlaid on the magnetic poles 5a, 5d, improving a resistance against an impact in the axial direction of the magnetic poles 5a, 5d.

In the embodiment, since the outer diameter of the balance weight 11 is positioned inside of recesses 20 on the outer diameter of the rotor yoke 2, a motor using a refrigerant can be structured without interrupting the refrigerant passage of the recesses 20. And, since the balance weight is not fixed to the rotatable shaft, insertion and fixing of the magnets and fixing of the balance weight can be made on the rotor independently, and the later process completes with the shrinkage fitting of the rotatable shaft, allowing a split production, and flexibility in the production is improved. Besides, since the balance weight is not fixed to the rotatable shaft, the balance weight is light-weighted and compact, and the production can be made inexpensively without requiring dimensional precision.

Figure 7:
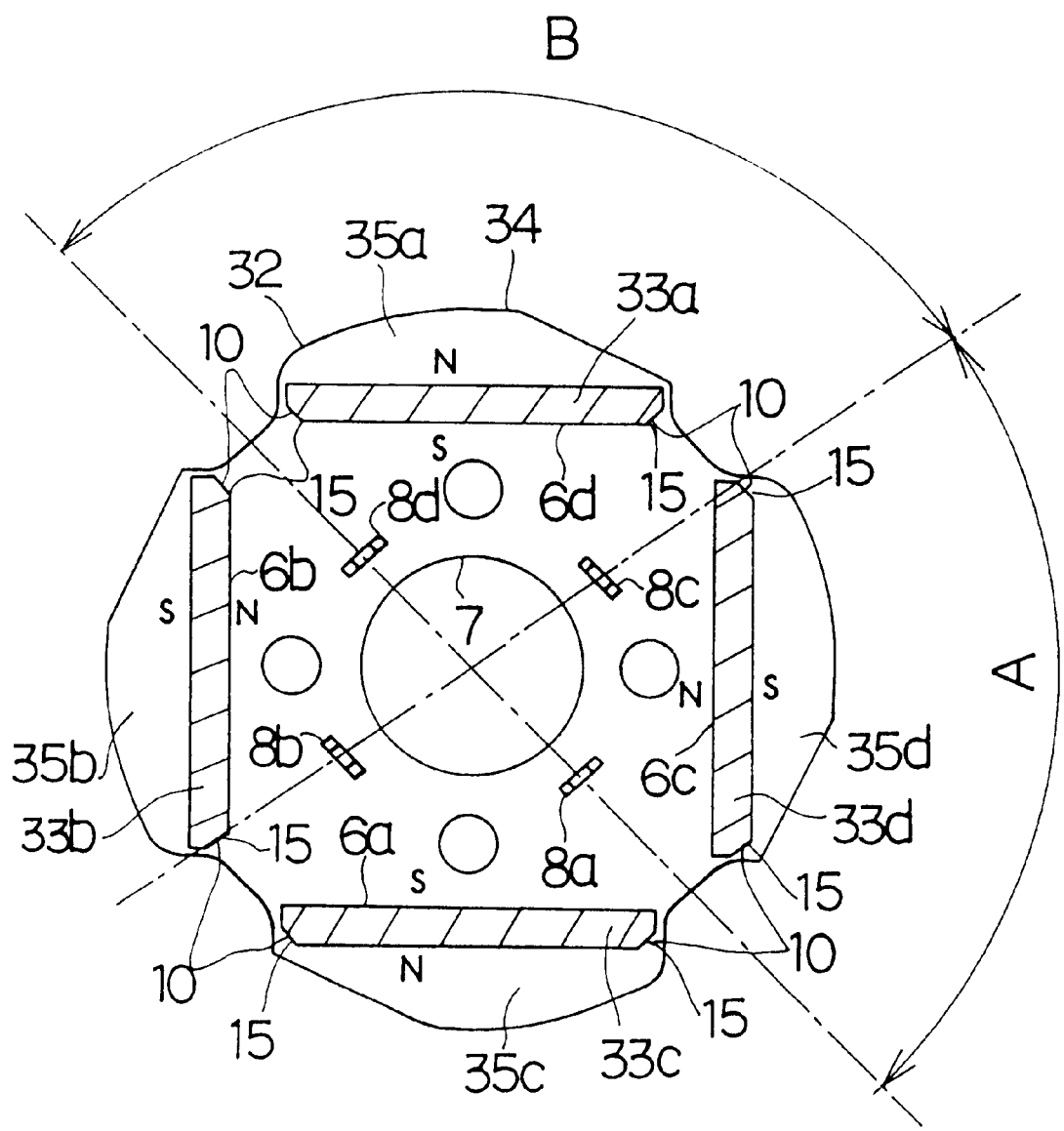
FIG. 7 is a sectional view showing the permanent magnet rotor according to another embodiment of the invention.

FIG. 7 is a sectional view showing another embodiment of the permanent magnet rotor of the invention with the permanent magnets for the field inserted.

The slots 6d, 6b, 6a and 6c are disposed at the bases of magnetic poles 35a, 35b, 35c and 35d of a silicon steel sheet 34 at a substantially equal distance from the rotatable shaft hole 7 of the rotor yoke. Permanent magnets 33a, 33b, 33c and 33d for the field are inserted into these slots 6d, 6b, 6a and 6c. The adjacent slots 6a, 6c have two large slopes 15 formed radially. The side slopes 15 are inclined at the same angle and have the same size, and these slots also have the same shape.

And, the adjacent slots 6b, 6d have two large slopes 15 formed to face the rotatable shaft hole 7. In the same way, these slots are formed have the same shape.

The slots 6d, 6a are opposed to each other with the rotatable shaft hole 7 between them, and these slots have the side slopes on the different positions. In the same way, the slots 6b, 6c are opposed to each other with the rotatable shaft opening 7 between them, and have the slopes at a different position when observed from the rotatable shaft opening 7. The permanent magnets 33a, 33b, 33c and 33d for the field are inserted into these slots so that the outer periphery of a rotor yoke 32 have N and S poles alternately.

Four caulking sections 8 (8a, 8b, 8c, 8d) are formed inside the permanent magnets for the field. The respective silicon steel sheets are fixed by press-fitting the caulking sections 8a, 8b, 8c and 8d. And, when the silicon steel sheet 34 is turned and overlaid to the end of the yoke 32 to fix the permanent magnets 33a, 33b, 33c and 33d in the axial direction, the silicon steel sheet 34 can be turned 90 degrees and 180 degrees with respect to the silicon steel sheet 14, so that fixing of the caulkings is limited to a turning of 180 degrees only as follows. Specifically, when the angle between the caulking sections 8a and 8c is determined to be A and the angle between the caulking sections 8c and 8d to be B, and these angles are not same, turning is limited to 180 degrees for fixing the caulking sections, and fixing is limited to prescribed permanent magnets for the field. Besides, the number of the caulkings and the number of the magnetic poles are determined to be same, and the angles A and B are related as follows.

$A+B=180$ (degrees) ($A \neq B$)

The embodiment has been described with the caulking angles determined to be A and B which are different. But, a rotor having four poles may be provided with four caulkings positioned at an equal interval, and the adjacent caulkings have a different size but the caulkings opposed to each other with the rotatable shaft hole 7 between them have the same size, so that a steel sheet to be fixed to the end of the rotor yoke can be fixed only when turned by 180 degrees. It is to be understood that the same result can be obtained when the adjacent caulkings are at a different position with respect to the rotatable shaft hole 7 and the caulkings opposing to each other with the rotatable shaft hole 7 between them are at the same position.

The two slopes 10 of the slots have been described to incline equally, but when only one of them is inclined at an angle same as the inclined angle of the outer diameter of the rotor yoke, it is possible to enhance the strength of bridges which connect the leading end and base of the magnetic pole.

Figure 8:
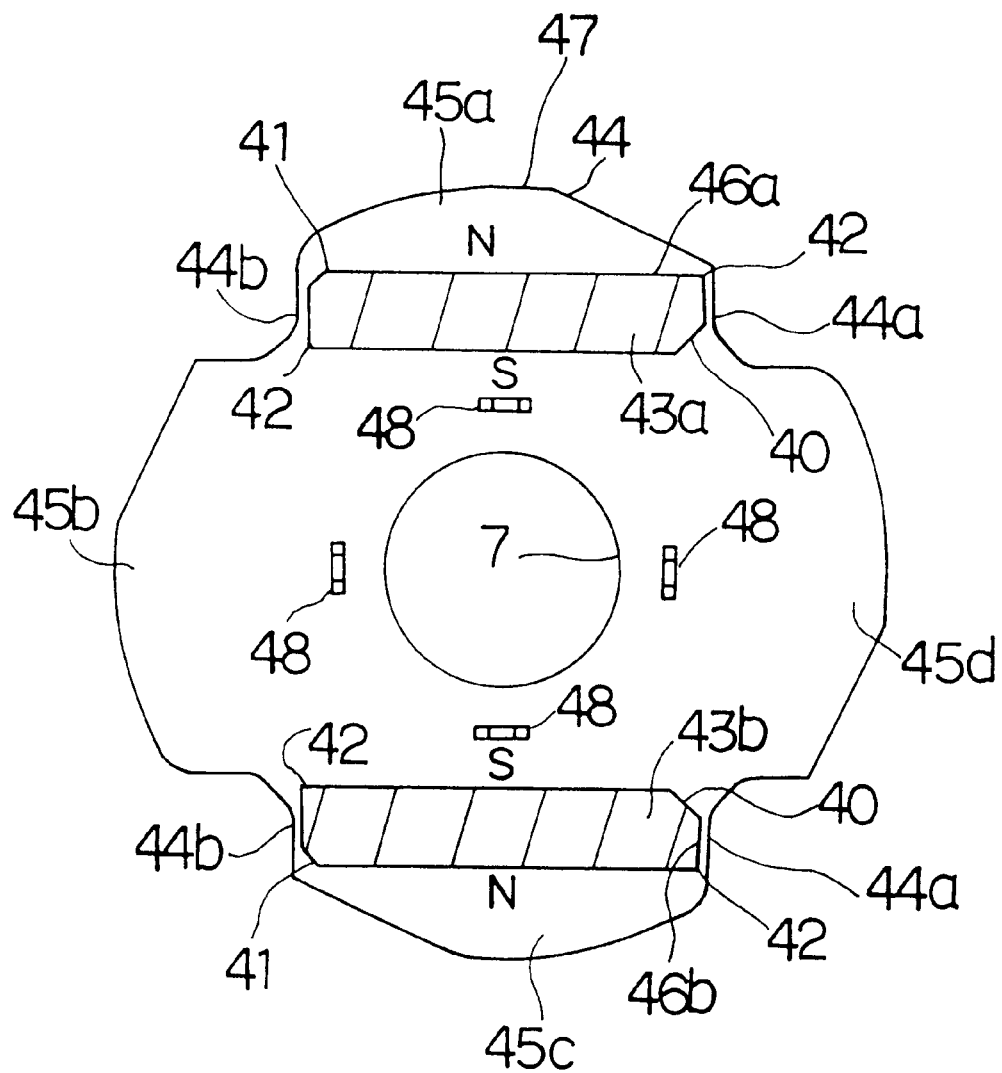
FIG. 8 is a sectional view showing the permanent magnet rotor according to another embodiment of the invention.

FIG. 8 is a sectional view showing that permanent magnets for a field are inserted according to another embodiment of a permanent magnet rotor of the invention.

A rotor yoke 47 consists of a large number of silicon steel sheets 44, slots 46a, 46b are at the bases of every other magnetic poles 45a, 45c of the silicon steel sheet 44 and positioned at a distance substantially equal from the rotatable shaft hole 7 of the rotor yoke. Permanent magnets 43a, 43b for the field are inserted into the slots 46a, 46b with S poles opposed to the rotatable shaft hole 7. The slots 46a, 46b have at least two slopes 40, 41 on their sides, and these slopes are different in size and opposed on a diagonal line. The large slope 40 is positioned on the side of the rotatable shaft. Other corners 42 do not have a slope.

The permanent magnets 43a, 43b for the field inserted into the slots 46a, 46b have large and small slopes. The silicon steel sheet 44 is turned by 180 degrees with respect to the silicon steel sheet 14, and caulkings 48 are caulked to fix to the end of the rotor yoke 47. Thus, the permanent magnets 43a, 43b for the field are fixed with the steel sheet overlaid on the corners 42.

When the permanent magnets for the field are thick in the rotor yoke 47, the slopes on the sides of the slots and the magnets can be formed large, so that fixing can be made firmly. As to the bridges which connect the leading end and base of the magnetic pole 45a, the slopes on the sides of the slots 46a, 46b are formed to have a different size, so that bridges 44a by the slopes 40 having a large inclination can be made to have a small width, and bridges 44b near the slopes 41 having a small inclination can be made to have a large width.

And, when the bridges 44a are pressed first and then the bridges 44b are pressed from a steel sheet by means of a die, bending of the magnetic poles 45a, 45c in the axial direction is reduced extensively. Preferably, when the slopes 40 having a large inclination are formed on the side of the rotatable shaft hole 7 rather than in the radial direction, the centers of gravity of the magnetic poles 45a, 45c are moved in the radial direction, so that the bridge strength is improved.

The permanent magnets 43a, 43b for the field have the same shape with the other one when one of them is rotated, in other words, the N and S poles and the slopes 40, 41 are same in position. Therefore, to insert the permanent magnets for the field into the rotor yoke 47, they can be produced in one type and simply inserted along the shapes of the slots without making a mistake in positioning the N and S poles. Thus, the rotor can be produced easily and simply.

In each embodiment, description has been made of the permanent magnets for the field which have two large slopes. But, the slopes may be formed at one or three positions and have a different angle. And, all slots of the magnetic poles may have a different shape. When all slots have a different shape, the steel sheets having four magnetic poles to be placed on the end are disposed at a turning angle of 90, 180 or 270 degrees, so that the movement of the permanent magnets for the field in the axial direction can be prevented, and the strength of the rotor yoke is improved because the application of stresses from the magnetic poles due to a centrifugal force is variable.

The above embodiment has been described on a structure that the four magnetic poles are formed on the outer periphery of the rotor yoke and the permanent magnets for the field are inserted into all magnetic poles. But, the embodiment is not limited to the above structure. This embodiment can be applied to a case that desired even numbered magnetic poles are formed and a permanent magnet for a field is inserted into each magnetic pole. And, the caulkings may be circular as well as square. And, the slope has an angle of 45 degrees in this embodiment, but it is not limited to it and can be chamfered. The slots of the rotor yoke and the permanent magnets for the field have been described in a hexahedral shape. It is to be understood that tile-shaped slots and tile-shaped permanent magnets for the field may be used with slopes formed on the sides, and the steel sheet at the end is rotated, so that the permanent magnets for the field can be fixed in the axial direction owing to a difference in the shape of slots.

Figure 9:
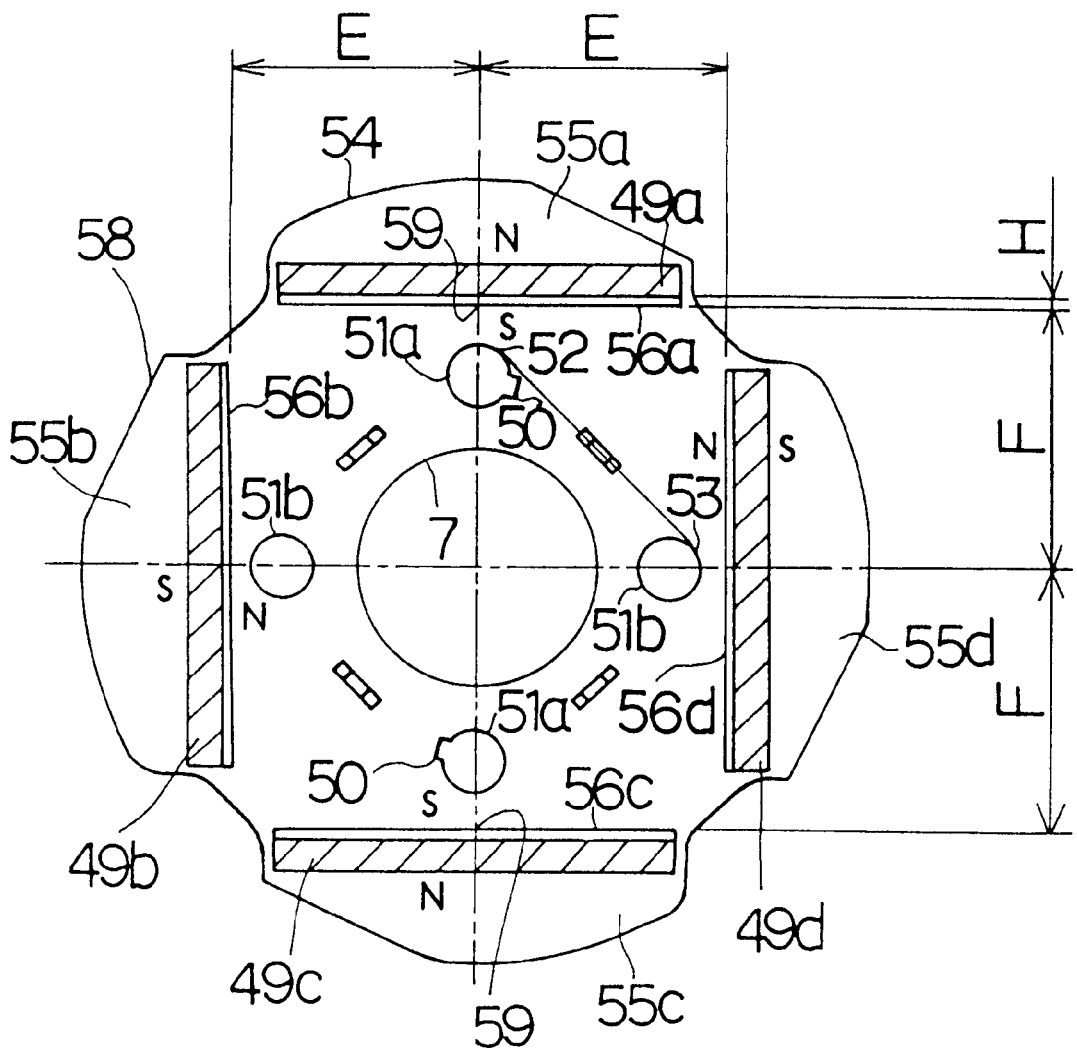
FIG. 9 is a sectional view showing the permanent magnet rotor according to another embodiment of the invention.

FIG. 9 is a sectional view showing that permanent magnets for a field are inserted according to another embodiment of a permanent magnet rotor of the invention.

A rotor yoke 58 is formed by punching a large number of silicon steel sheets 54 by a die and laminating them into one body. Within the silicon steel sheets 54, slots 56a, 56b, 56c and 56d are formed at the bases of magnetic poles 55a, 55b, 55c and 55d. The slots 56a, 56c are formed a distance F away from the rotatable shaft hole 7, and the slots 56b, 56d are formed a distance E away from the rotatable shaft hole 7. The distances F and E are different to each other, and the slots 56a, 56c as well as the slots 56b, 56d are opposed to each other with the rotatable shaft hole 7 between them.

The slots 56a, 56b, 56c and 56d are formed to have the same thickness, and permanent magnets 49a, 49b, 49c and 49d which are inserted into the above slots have the same thickness. To insert the permanent magnets 49a, 49b, 49c and 49d smoothly, the thickness (including the thickness of plating) of the permanent magnets for the field and the thickness of the slots have a gap H.

The gap H is generally determined to be 0.01 to 0.3 mm, because the permanent magnets for the field, particularly rare earth permanent magnets, are generally plated to prevent a magnetic flux from being deteriorated due to rust and permeation of a refrigerant. Thus, the gap of the above value is provided so that the plating is prevented from being separated and its strength from being deteriorated. Particularly, the thickness of plating on the permanent magnets for the field tends to be not uniform and is thick on the edges by about 0.02 mm on one side from the center of the permanent magnets for the field. If the size is small to separate the plating, the separated surface is easily corroded by the refrigerant. Thus, the gap H is required to be 0.01 to 0.3 mm at the edges (including the thickness of plating) of the permanent magnets for the field and the edges of the slots.

And, the slots 56a, 56b, 56c and 56d tend to have their thickness decreased to be smaller at the middle than at the edges when the rotor shape is pressed from a steel sheet and a pressure is applied with the caulkings stacked. Therefore, when a gap is provided between the slot and the permanent magnet for the field, a gap of 0.01 to 0.3 mm is kept at the middle and the plating is not removed. And, in view of a thickness tolerance of the permanent magnet for the field and a thickness tolerance of the slot derived from the production cost of the permanent magnet for the field and the die production cost for the slot, a value of 0.3 mm was determined at most.

The distance F of the slots 56a, 56c from the center of the rotatable shaft hole and the distance E of the slots 56b, 56d from the center of the rotatable shaft hole are generally to have a difference in slot position |F−E| to be 0.3 to G/2 (G: thickness of permanent magnet for field), preferably to be 0.3 to G/4 in order to keep a difference between surface magnetic flux densities of the magnetic poles and necessity of the lowering of effective magnetic flux due to the leakage of magnetic flux because of the overlaying of the silicon steel sheet 54 on the permanent magnets for the field. Reasons of setting to 0.3 to G/4 are that at a value exceeding the above level, the leaked magnetic flux increases, and the effective magnetic flux is decreased, resulting in a poor efficiency. Namely, when the steel sheets are overlayed at the end of the permanent magnets for the field, magnetic fluxes leak from the magnets at part of the laminated steel sheet, and effective magnetic flux in the passage where they should originally flow from the rotor yoke are decreased steeply, and the motor efficiency is lowered.

When the silicon steel sheets are laminated, since a difference between the distances E, F is small, it is difficult to determine the positions of the slots based on the difference between the distances E, F. Therefore, a groove 50 is formed as a mark for laminating the silicon steel sheets in openings 51a only which are positioned inside the slots 56a, 56c among the openings for inserting the rivets. Thus, the efficiency of assembling work is improved. Accordingly, this embodiment marks a slot identification mark near one of the slots which is distant from or close to the rotatable shaft hole.

The grooves 50 are preferably formed inside contact points 52, 53 on a tangent line outside the openings. Thus, the flow of magnetic fluxes of the permanent magnets for the field is not interrupted. Besides, the front and back of the silicon steel sheet can be distinguished according to the positions of the grooves 50. The grooves 50 may be in any shape and can be formed within the slots. To form a slot identification mark within the slots, it is preferably formed at a position not interrupting the magnetic flux of the permanent magnets for the field, namely, the center of the permanent magnets for the field and at a point 59 on the side of the rotatable shaft hole 7. Thus, the slot identification mark may be formed on either of the slots which is distant from or close to the rotatable shaft hole.

Figure 10:
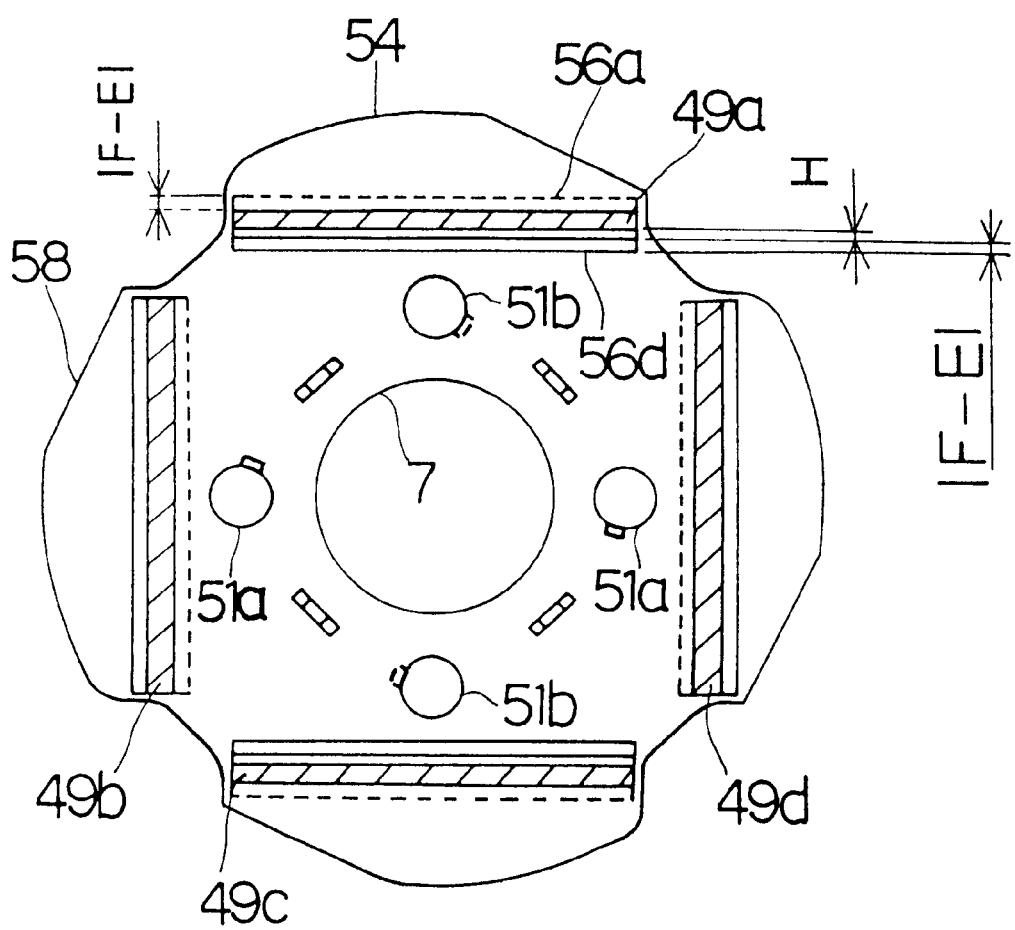
FIG. 10 is a sectional view showing the permanent magnet rotor according to another embodiment of the invention.

FIG. 10 is a sectional view showing the silicon steel sheet 54 at the end of the rotor yoke 58 turned by 90 degrees from the state shown in FIG. 9, and the permanent magnets for the field are inserted.

The silicon steel sheet 54 is fixed by the caulkings, and rivets are inserted into the openings 51a, 51b. To fix the permanent magnet 49a for the field in the axial direction, a 90-degree turning is made with respect to the slot 56a of the rotor yoke 58 to make the slot 56d to have a difference $|F-E|$ of distances from the rotatable shaft hole 7, thereby fixing.

The relation between the difference $|F-E|$ and a difference H between the slot thickness and the thickness of the permanent magnet for the field is expressed as $|F-E| \geq H$. The larger the separation between the difference $|F-E|$ and the difference H, the firmer the fixing of the permanent magnets for the field in the axial direction becomes.

In the above embodiment, the distances from the four slots to the rotatable shaft hole are equal for the same poles but different for different poles, but all distances between the rotatable shaft hole and the slots may be different for all four slots. In this case, when a difference between the maximum and minimum distances between the rotatable shaft hole and the slots is suppressed to 1 mm or below, it was found that gap magnetic flux densities of the outer diameter of the rotor are substantially equal when the permanent magnets for the field having the same energy product are inserted. When the slots are disposed at different positions, the steel sheet can be fixed onto the end of the rotor yoke in the axial direction of the permanent magnets for the field by turning to any angle among 90, 180 and 270 degrees.

In the above embodiment, the permanent magnets for the field have been described to have the same performance. When a permanent magnet for a field having a low coercive force is inserted into a slot distant from the rotatable shaft hole and a permanent magnet for a field having a coercive force higher than the above permanent magnet for the field is inserted into a slot near the rotatable shaft hole, a resistance is increased against demagnetization of the permanent magnets for the field with respect to the magnetic field generated when a current is passed through a winding. In addition, by configuring as described above, a magnet poor in thermal resistance can be used inside against influences of heat traveled from the rotor exterior.

Figure 11:
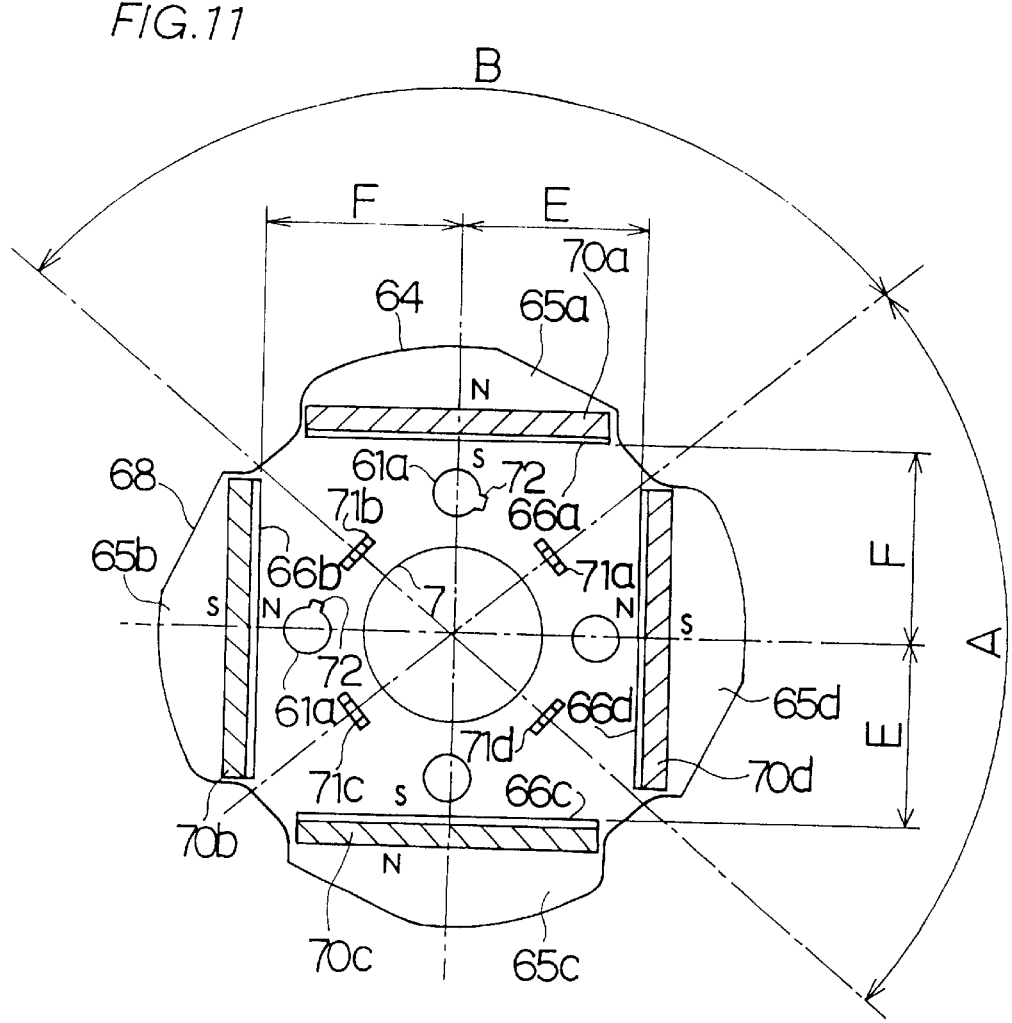
FIG. 11 is a sectional view showing the permanent magnet rotor according to another embodiment of the invention.

FIG. 11 is a sectional view showing another embodiment of a permanent magnet rotor of the invention with permanent magnets for a field inserted.

A rotor yoke 68 is formed by pressing a large number of silicon steel sheets 64 by a die and laminating them into one body. Within the silicon steel sheets 64, slots 66a, 66b, 66c and 66d are formed at the bases of magnetic poles 65a, 65b, 65c and 65d. Among them, the slots 66a, 66b are formed a distance F away from the rotatable shaft hole 7, and the slots 66c, 66d are formed a distance E away from the rotatable shaft hole 7. The distance F of the slots 66a, 66b is different from the distance E of the slots 66c, 66d. Permanent magnets 70a, 70b, 70c and 70d for a field are inserted into the slots 66a, 66b, 66c and 66d, and the slot 66a is opposed to the slot 66c with the rotatable shaft hole 7 between them, and the slot 66b is also opposed to the slot 66d with the rotatable shaft hole 7 between them.

To fix the permanent magnets for the field in the axial direction, the silicon steel sheet 64 is turned by 180 degrees with respect to the other silicon steel sheets and fixed by caulkings 71 (71a, 71b, 71c, 71d) to the end of the rotor yoke 68. And, when the silicon steel sheet is overlaid, it is difficult to determine the positions of the slots based on a difference between the distances E, F because the difference between the distances E, F is small. Therefore, in the same way as in the cases of FIG. 9 and FIG. 10, a groove 72 is formed on openings 61a, 61b only for inserting rivets inside the slots 66a, 66b as a mark for determining the positions to laminate the silicon steel sheets.

Furthermore, the number of caulkings for fixing the respective steel sheets is formed at four positions in the same number as the magnetic poles within the silicon steel sheet. The caulkings 71a, 71d and the caulkings 71b, 71c are separated by angle A, and the caulkings 71a, 71b and the caulkings 71c, 71d are separated by angle B ($A \neq B$, $A+B = 180$ (degrees)).

Therefore, to fix the silicon steel sheet for fixing the permanent magnets for the field to the end of the rotor yoke, when turned by 90 degrees, the caulkings cannot be fixed, and the permanent magnets for the field cannot be fixed either. But, when turned by 180 degrees, the slots are displaced to enable the fixing of the magnets for the field, and the caulkings can also be fixed. Thus, the misplacement of the silicon steel sheet on the end of the rotor yoke 58 can be prevented by determining the angle between the above caulkings.

The above embodiment has been described about the structure that the four magnetic poles are formed on the outer periphery of the rotor yoke, and the permanent magnets for the field are inserted into all the magnetic poles. But, it is to be understood that the embodiment is not limited to the above structure and can be applied to a case that a desired even number of magnetic poles is formed and the permanent magnets for the field are inserted into these magnetic poles.

Figure 12:
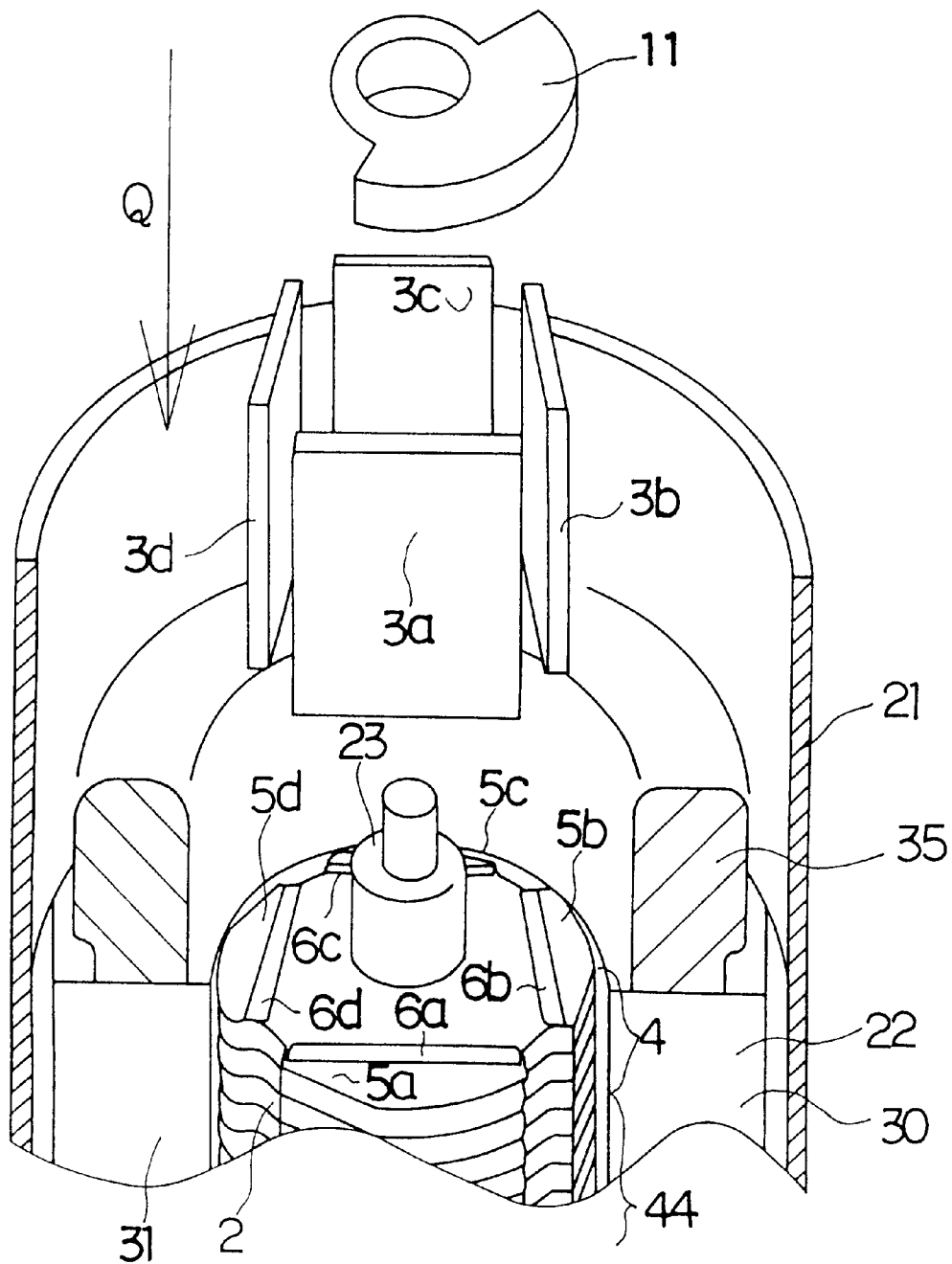
FIG. 12 is an exploded perspective view showing a compressor using a permanent magnet rotor of the invention.

FIG. 12 is an exploded sectional view showing a compressor using a permanent magnet rotor of the invention. A sealed vessel 21 in which a refrigerant and an oil flow has a drive motor 22 disposed in series above a compression device (not shown).

The drive motor 22 comprises a permanent magnet rotor of the invention and a stator 30. The stator 30 comprises a stator core 31 and an exciting coil 35.

The permanent magnet rotor of the invention has a rotor yoke 2 and two pairs of plate permanent magnets 3a, 3b, 3c and 3d for a field. The rotor yoke 2 comprises a group of silicon steel sheets 4 at both ends and another group of silicon steel sheets 44 at the middle in the laminated form. Each steel sheet to be described in detail afterward is punched out by a progressive die. The steel sheets for the rotor yoke 2 have four magnetic poles 5a, 5b, 5c and 5d protruded outward radially formed on the outer periphery. These magnetic poles have at their bases slots 6a, 6b, 6c and 6d for inserting the permanent magnets for the field.

To assemble a refrigerating cycle compressor, the rotor yoke 2 is heated for several minutes prior to being inserted into the rotatable shaft 23. To the rotatable shaft 23 disposed within the sealed vessel 21, the rotor yoke 2 heated is fitted in direction Q, and the permanent magnets 3a, 3b, 3c and 3d for the field are inserted and fixed while the rotor yoke 2 is kept at a high temperature. And, a balance weight 11 is press fitted to about the end of the rotor yoke 2.

After fitting the above components, a lid (not shown) of the sealed vessel 21 is closed, and the rotatable shaft 23 is mechanically fixed. By passing a high current through an exciting coil 35, the permanent magnets for the field are magnetized, and hot air is blown to dry the interior of the sealed vessel 21 to evaporate moisture.

Thus, to fit the rotor yoke to the rotatable shaft, the rotor yoke is heated. This heating expands the rotatable shaft hole at the center to have a slightly larger diameter, and the rotor yoke which is still hot is fitted to the rotatable shaft, so that the rotor yoke can be easily fitted to the rotatable shaft. When the rotor yoke is cooled, the rotatable shaft hole is contracted, and the rotor yoke is fixed to the rotatable shaft. In the same way, since the permanent magnets for the field are inserted and fixed while the rotor yoke is still hot, or the rotor yoke is heated to enlarge the slots and the permanent magnets for the field are inserted into the enlarged slots, thus the magnets are easily inserted. And, when the rotor yoke is cooled, the slots are contracted, and the permanent magnets for the field are fixed by the slots. Thus, since the embodiment uses the residual heat to fix the permanent magnets for the field into the slots, a processing time can be decreased, and a tool for fixing the permanent magnets for the field in the axial direction is not required.

Figure 13:
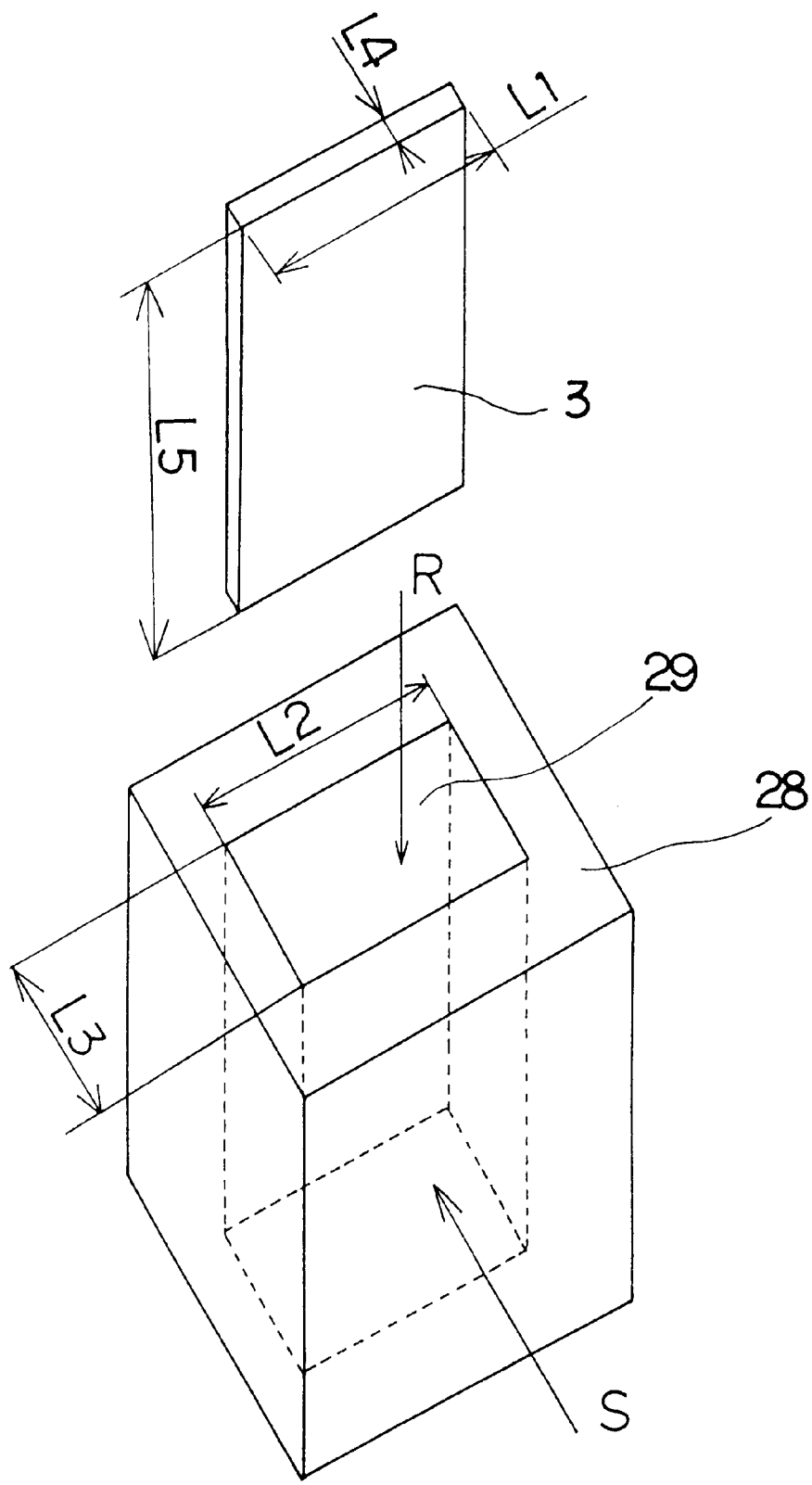
FIG. 13 is a perspective view of a pattern used in a production process for a permanent magnet for a field.

FIG. 13 is a perspective view showing a pattern used in a production process of the permanent magnet for the field.

A pattern 28 has its four sides closed by walls having an appropriate thickness. Magnetic powder 29 for the permanent magnet 3 for the field is placed in the center of the pattern 28, which is then placed and heated in a sintering furnace (not shown) at about 1000° C. for one to two hours with a pressure applied in direction R while applying a magnetic field in direction S, then further heated at about 600° C. for three hours. After cooling, a magnet block having a thickness L3 is cut to several permanent magnets for a field having a thickness L4 to produce the permanent magnets 3 for the field. Since a size L1 of the permanent magnet for the field is determined by the precision of a mold for L2 of the pattern 28, a precise size can be obtained easily for L1 without any additional processing. On the other hand, the thickness L4 of the permanent magnet for the field largely depends on the precision of cutting. And, a length L5 of the permanent magnet for the field is largely affected by the magnitude of a load applied in direction R by a press.

Figure 14:
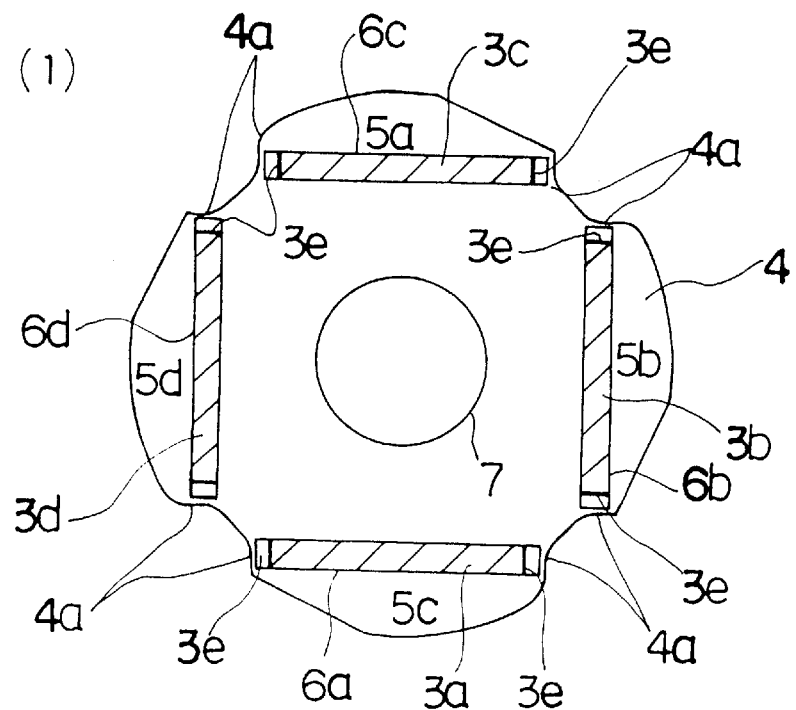
FIG. 14 is sectional views showing the permanent magnet rotor according to another embodiment of the invention.
Figure 14:
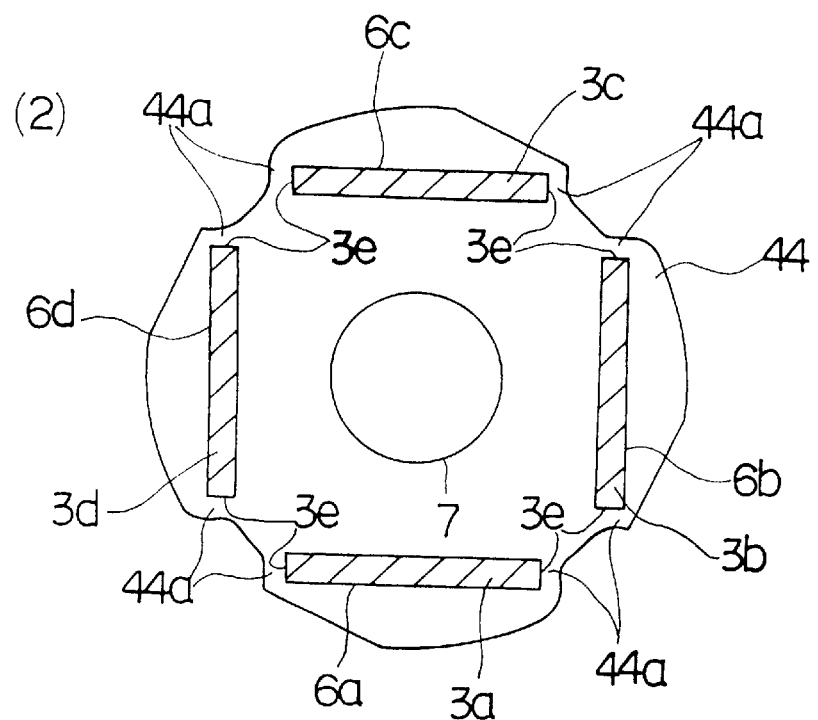

FIG. 14 shows sectional views of permanent magnet rotors according to other embodiments of the invention, and shows the permanent magnets 3 for the field inserted using the residual heat of the rotor yoke 2 as described above.

FIG. 14 (1) shows that the permanent magnets for the field are inserted into the rotor yoke but not fixed to the silicon steel sheet 4, and FIG. 14 (2) shows that the permanent magnets for the field are fixed to the silicon steel sheet 44 of the rotor yoke. In FIG. 14 (1), the silicon steel sheet 4 has four magnetic poles 5a, 5b, 5c and 5d protruded outward radially formed on the outer periphery. These magnetic poles have at their bases the slots 6a, 6b, 6c and 6d for inserting the permanent magnets for the field, and also have bridges 4a to connect the leading ends and bases of the magnetic poles. The silicon steel sheet 4 has the slots 6a, 6b, 6c and 6d formed rather widely in the longitudinal direction and the bridges 4a produced thin. Therefore, a small gap is formed between the sides of the slots 6a, 6b, 6c and 6d and sides 3e of the permanent magnets 3a, 3b, 3c and 3d for the field.

On the other hand, as shown in FIG. 14 (2), bridges 44a of the silicon steel sheet 44 which connect the leading ends and bases of the magnetic poles are widely formed. Therefore, differing from the silicon steel sheet 4, there is not a gap between the sides of the slots and the sides of the magnets. And, as described above, the rotor yoke is heated to fit to the rotatable shaft, and the permanent magnets for the field are inserted into the slots while the residual heat is still available. Then, the rotor yoke is cooled and the slots are contracted, then the sides 3e of the permanent magnets for the field come to contact with the sides of the slots 6a, 6b, 6c and 6d, and the permanent magnets 3a, 3b, 3c and 3d for the field are fixed by the silicon steel sheet 44.

Besides, the permanent magnet rotor is also produced as follows.

Specifically, the slots 6a, 6b, 6c and 6d and the permanent magnets 3a, 3b, 3c and 3d are not fixed at their contacting points. And, to fit the rotor yoke to the rotatable shaft, the rotor yoke is heated and then fitted to the rotatable shaft.

In this case, the permanent magnets for the field are obtained from a magnet block to have a prescribed thickness (L4), and other faces of the magnets are determined by the pattern of a die for making the magnets. Since the magnet thickness (L4) is largely related to the presence of influences by heat and a motor performance, it is required to be accurate. On the other hand, a size L1 and a length L5 do not largely affect the motor performance even if their tolerances are large. Therefore, a difference between the magnet and the magnet separation preventing member (silicon steel sheets 14, 24 at the end of yoke and other members) may be larger than that in thickness between the slot and the magnet, and a difference in width between the slot and the magnet may be larger than that in thickness between the slot and the magnet.

And, there is an embodiment that the slots and the permanent magnets for the field may be disposed without being fixed at any contacted points. In this case, the permanent magnets for the field are processed to a prescribed thickness from the magnet block, and other faces of the magnets are determined by the pattern of a die for making the magnets. And, when magnetized, the permanent magnets for the field are fixed in the slots by the attracting force.

Thus, in this embodiment, the silicon steel sheets for forming the rotor yoke consist of the silicon steel sheets 4 and the silicon steel sheets 44, and when the ratio of the number of the above steel sheets is changed, a fixing strength to the permanent magnets for the field can be changed. Therefore, an optimum strength can be suitably selected according to the magnitude of vibrations caused in the environment the rotor is used. And, a production cost can be decreased because the size of the permanent magnet for the field can be determined easily by using an appropriate mold.

And, this embodiment has the following advantages by disposing the silicon steel sheet 4 which has the permanent magnets for the field inserted but not fixed at both ends of the rotor yoke in the axial direction and disposing the silicon steel sheets 44 for fixing the permanent magnets for the field substantially at the middle. Specifically, when the rotor yoke is set to a shrinkage fitting temperature and fitting the rotor yoke to the rotatable shaft, the silicon steel sheets 44 at the middle lower their surface temperature slower than the silicon steel sheets 4 disposed at both ends, so that the permanent magnets for the field are inserted easily, and since the silicon steel sheets 44 at the middle have a bridge width thicker than the silicon steel sheets 4, the bridges 44a lower their temperature slower and suffer from a less deformation.

Therefore, the leading ends of the magnet poles are not deformed, and the magnets for the field have a firm fixing strength. Furthermore, a time for inserting the permanent magnets for the field can be made long.

The silicon steel sheets 4 and the silicon steel sheets 44 are different in the size of the slots only. Therefore, they can be produced by one type of progressive die in order of punching out the slots of the silicon steel sheets 44 and then the slots of the silicon steel sheets 4.

Figure 15:
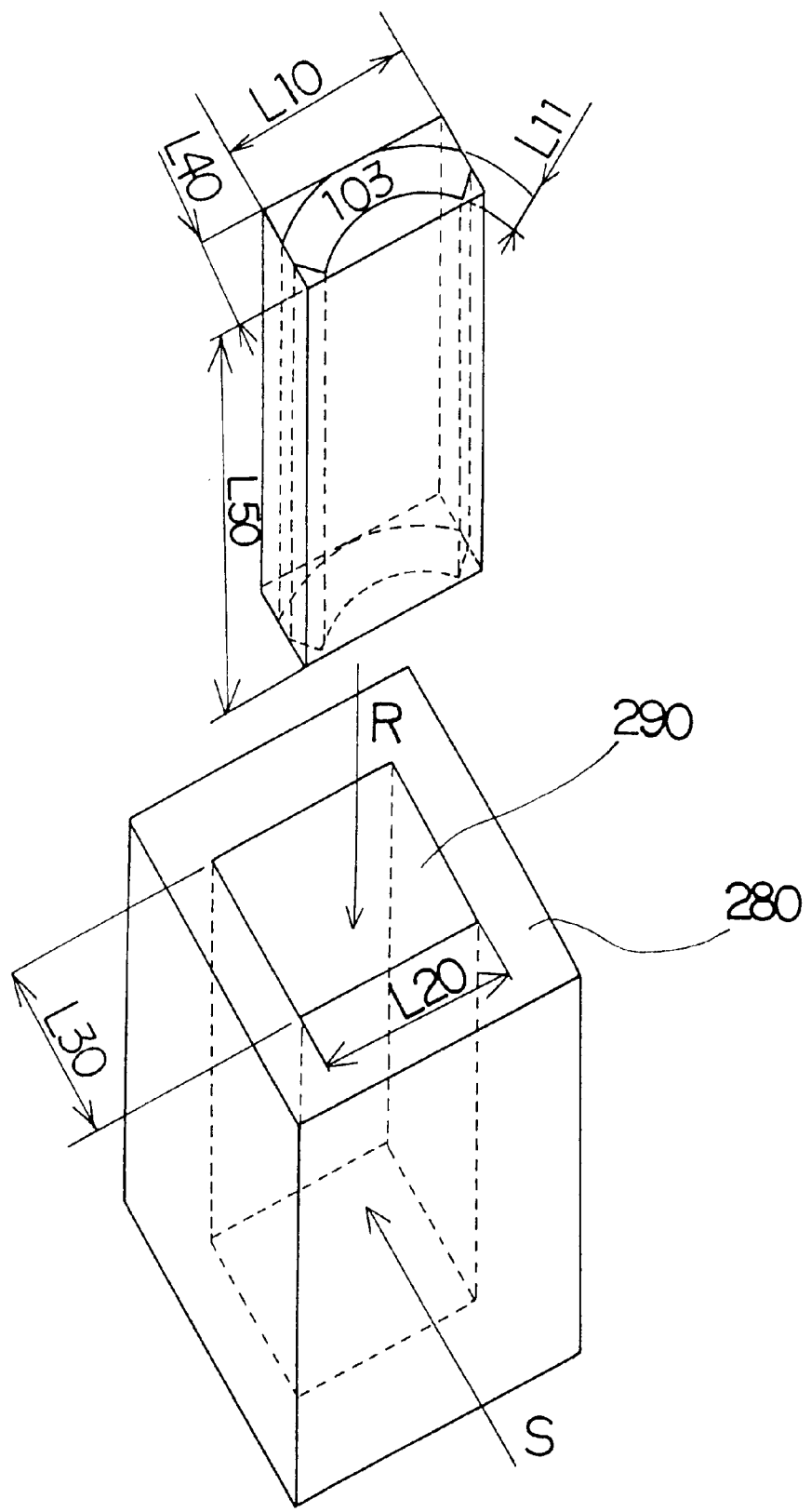
FIG. 15 is a perspective view of a pattern used in a production process for a permanent magnet for a field.

FIG. 15 is a perspective view showing a pattern used in a production process for a permanent magnet for a field.

In this embodiment, a pattern 280 is formed with four sides closed by walls having an appropriate thickness in the same way as the pattern 28 (see FIG. 13). Magnetic powder 290 for the permanent magnet 103 for the field is placed in the center of the pattern 280, which is then placed and heated in a sintering furnace (not shown) at about 1000° C. for one to two hours with a pressure applied in direction R while applying a magnetic field in direction S, then heated at about 600° C. for three hours. After cooling, a magnet block having a thickness L30 is cut to permanent magnets for a field having a thickness L40, which have the inner and outer peripheries and side faces processed to produce the permanent magnets 103 for the field having the shape of a fan. Since a size L10 of the permanent magnet for the field is determined by the precision of a mold for L20 of the pattern 280, a precise size L10 can be obtained easily without another processing. And, the thickness L40 of the permanent magnet for the field is largely affected by the cutting precision, and a length L50 of the permanent magnet for the field depends on the magnitude of a load applied in direction R by a press.

Figure 16:
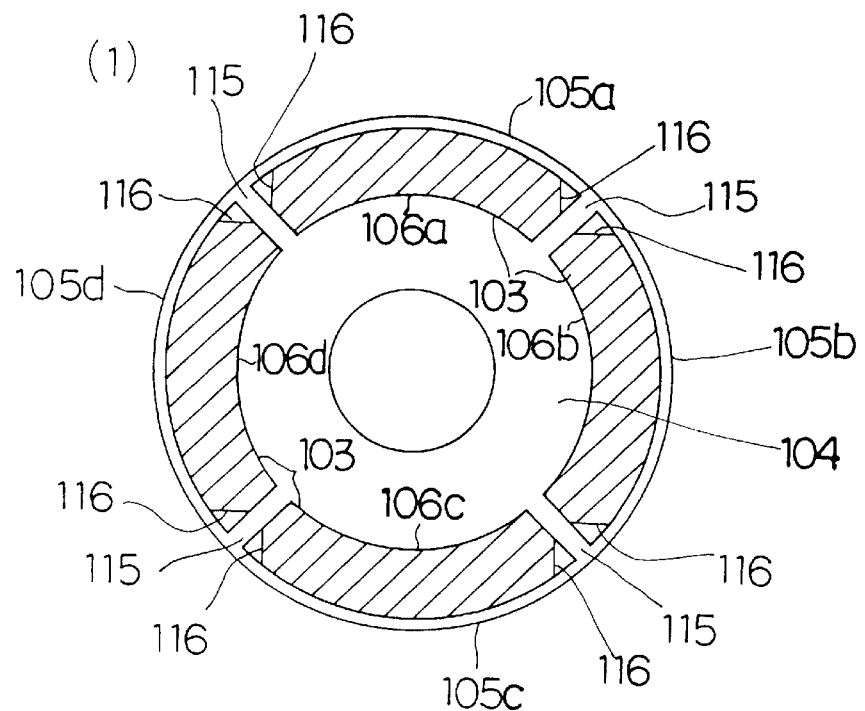
FIG. 16 is sectional views showing the permanent magnet rotor according to another embodiment of the invention.
Figure 16:
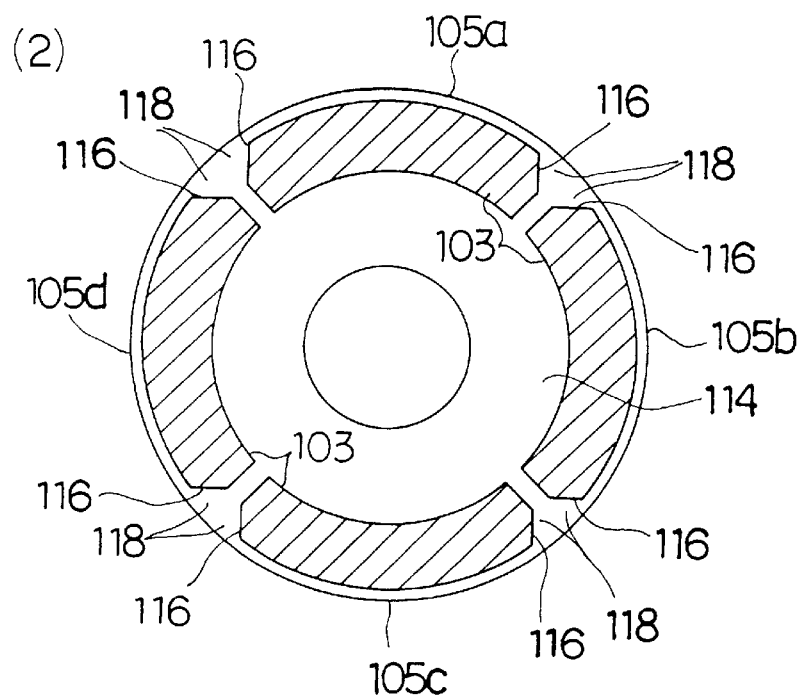

FIG. 16 shows sectional views of permanent magnet rotors according to another embodiment of the invention.

In this embodiment, the above fan-shaped permanent magnets 103 for the field are used.

FIG. 16 (1) shows that the permanent magnets for the field are inserted into the rotor yoke but not fixed to a silicon steel sheet 104. And, FIG. 16 (2) shows a state that the permanent magnets for the field are fixed to a silicon steel sheet 114 of the rotor yoke. In FIG. 16 (1), the silicon steel sheet 104 has four magnetic poles 105a, 105b, 105c and 105d protruded outward radially formed on the outer periphery. These magnetic poles have at their bases slots 106a, 106b, 106c and 106d for inserting the permanent magnets for the field, and also have bridges 115 to connect the leading ends and bases of the magnetic poles. The silicon steel sheet 104 has the bridges 115 produced to be long. And, the permanent magnets 103 for the field have their corners cut at an inclined angle. Therefore, a gap is formed between the sides of the slots 106a, 106b, 106c and 106d and cut sides 116 of the permanent magnets 103 for the field.

On the other hand, as shown in FIG. 16 (2), the silicon steel sheet 114 has bridge ends 118 formed broad, and there is not a gap between the slot side and the magnet side differing from the silicon steel sheet 104. And as described above, the rotor yoke is heated to fit to the rotatable shaft, and the permanent magnets for the field are inserted into the slots while the residual heat is still available. Then, when the rotor yoke is cooled and the slots are contracted, the cut sides 116 of the permanent magnets for the field come in contact with the sides of the slots 106a, 106b, 106c and 106d, and the permanent magnets 103 for the field are formed to have a size to be fixed to the silicon steel sheet 114.

Thus, in the same way as in the embodiment shown in FIG. 14, this embodiment forms the silicon steel sheets for the rotor yoke by the silicon steel sheets 104 and the silicon steel sheets 114. Further, the ratio of the numbers of the steel sheets is changed to change a fixing strength of the permanent magnets for the field. Therefore, an optimum strength can be suitably selected according to tough usage conditions which produce vibrations. And, since the size of the permanent magnets for the field can be easily obtained by using an appropriate mold, a production cost can be made inexpensive.

Furthermore, in this embodiment, the silicon steel sheet 104 which has the permanent magnets for the field inserted but not fixed is disposed on each end of the rotor yoke in the axial direction, and the silicon steel sheets 114 for fixing the permanent magnets for the field are disposed substantially at the middle, thereby providing the same advantages as the embodiment shown in FIG. 14. Specifically, when the rotor yoke is set to a shrinkage fitting temperature and fit to the rotatable shaft, the silicon steel sheet 114 at the middle lower the surface temperature slower than the silicon steel sheets 104 at both ends, so that the permanent magnets for the field can be inserted easily, and since the silicon steel sheets 114 at the middle have the bridge ends 118 which are broader and wider than the silicon steel sheets 104, the bridges lower their heat slower and are not deformed largely. Therefore, the fixing strength of the magnets for the field can be made firm without deforming the leading ends of the magnetic poles. Besides, by easing the inclination of the lowering temperature of the residual heat, time available for inserting the permanent magnets for the field can be extended.

The silicon steel sheets 104 and the silicon steel sheets 114 are different in the size of the slots only. Therefore, they can be produced by one type of progressive die in order of punching out the slots of the silicon steel sheets 114 and then the slots of the silicon steel sheets 104.

Figure 17:
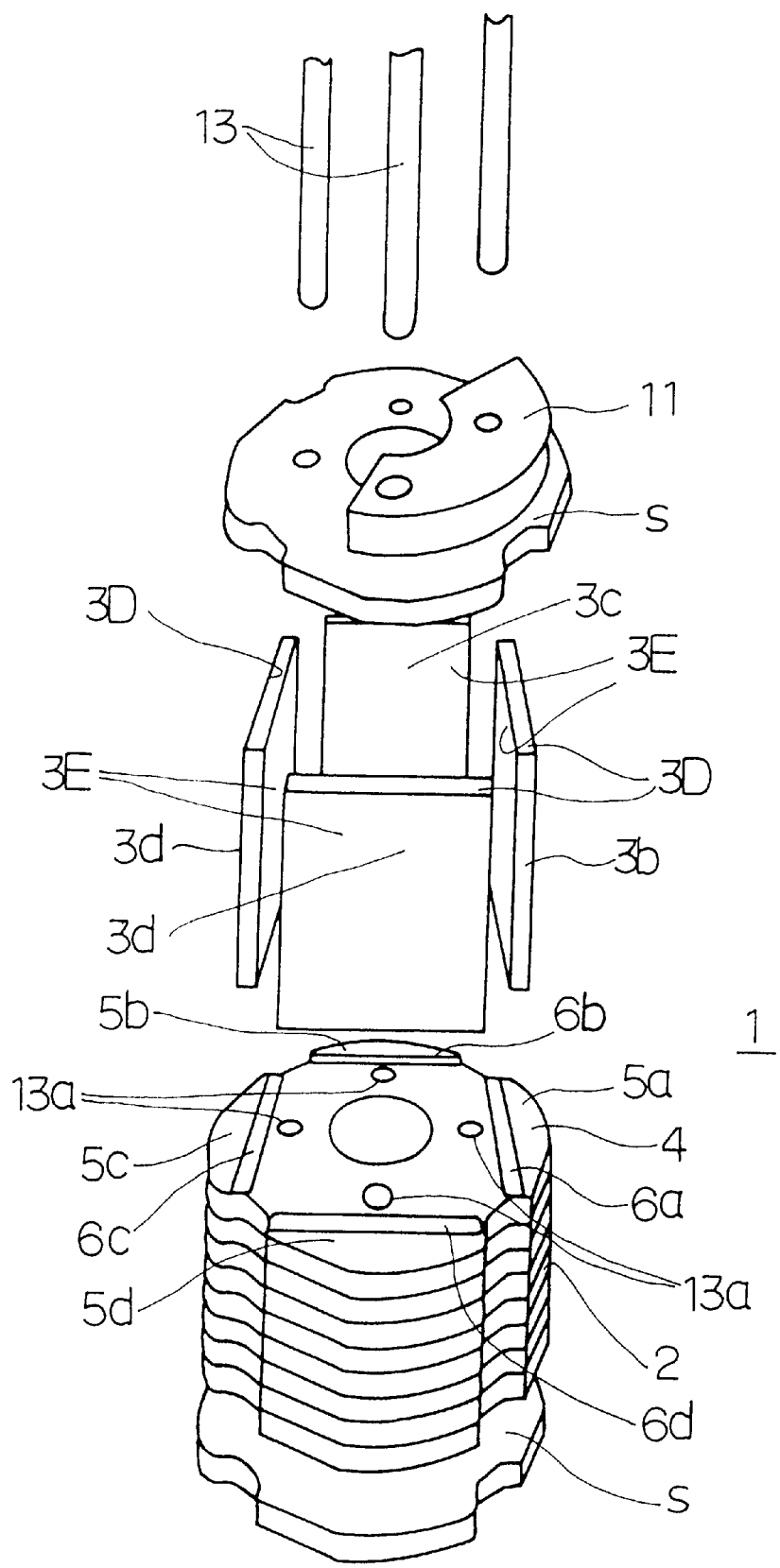
FIG. 17 is a perspective view showing the permanent magnet rotor according to another embodiment of the invention in an exploded state.

FIG. 17 is an exploded view showing a permanent magnet rotor according to another embodiment of the invention. A permanent magnet rotor 1 of this embodiment has a rotor yoke 2 laminated into a column and two pairs of plate permanent magnets 3 (3a, 3b, 3c and 3d) for a field. The rotor yoke 2 is formed by punching out many silicon steel sheets 4 by a die and laminating into one body. The rotor yoke 2 has four magnetic poles 5 (5a, 5b, 5c and 5d) protruded radially formed on the outer periphery. These magnetic poles have at their bases slots 6 (6a, 6b, 6c and 6d) for inserting the permanent magnets for the field. Furthermore, at the center of the rotor yoke 2, a rotatable shaft hole 7 is formed to pass a drive shaft through it. And, rivet through holes 13a are formed on the shortest distance between the slots and the rotatable shaft hole 7 to fix the permanent magnets for the field in the axial direction.

Figure 18:
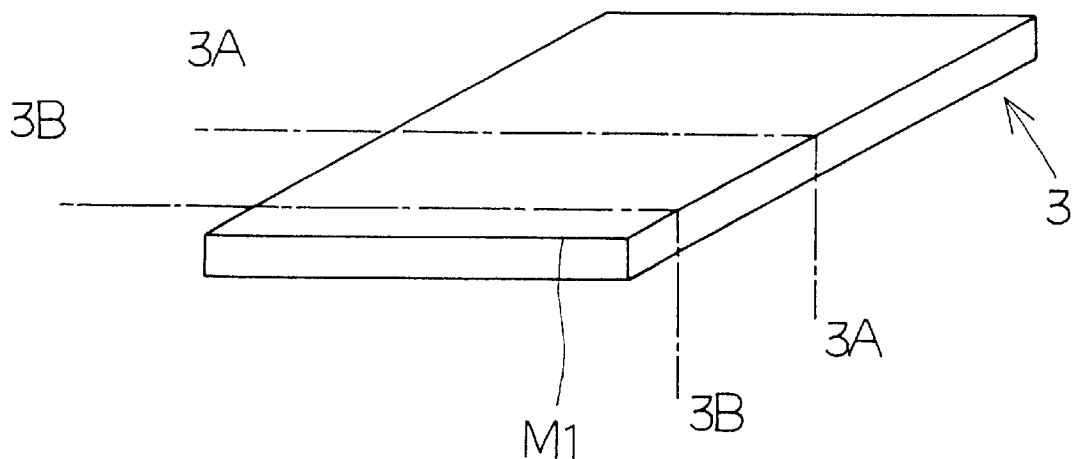
FIG. 18 is diagrams showing a permanent magnet for a field used in the invention, where (a) is a perspective view, (b) a sectional view at the center, and (c) a sectional view at one end.
Figure 18:
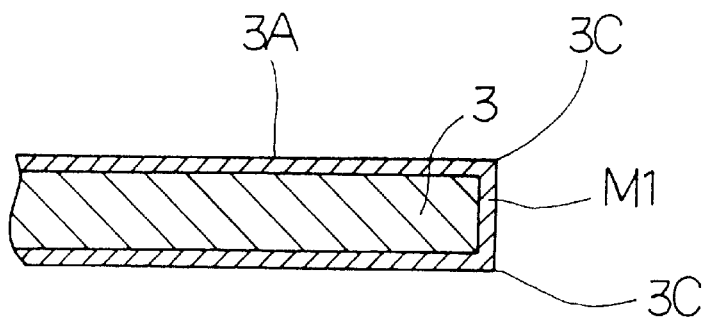
Figure 18:
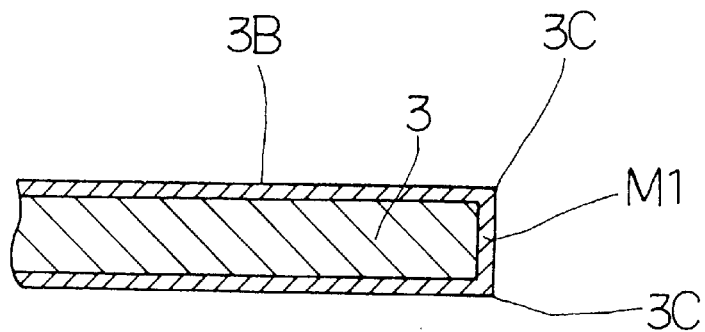

The permanent magnets 3a, 3b, 3c and 3d for the field are formed into a hexahedron having a rectangular cross section as shown in FIG. 18 (a), and the permanent magnets for the field have their surfaces applied with an electric nickel plating M1. This electric nickel plating M1 is applied by a plating means to be described afterward.

Furthermore, the permanent magnets 3 for the field are inserted into the slots 6, to fix the permanent magnets for the field in the axial direction, non-magnetic spacers s are disposed at each end of the rotor yoke 2, a balance weight 11 is positioned to keep a dynamic balance of a compression device, then the rotor yoke 2, the spacers s and the balance weight 11 are fixed together by caulking with rivets 13. Thus, the permanent magnet rotor 1 of the embodiment is assembled.

In the invention, the electric nickel plating is electroplating that a plated film has substantially a uniform thickness at a center 2A of the permanent magnet 3 for the field shown in FIG. 18 (b) and an end 3B shown in FIG. 18 (c) and does not have any electrode mark.

Figure 19:
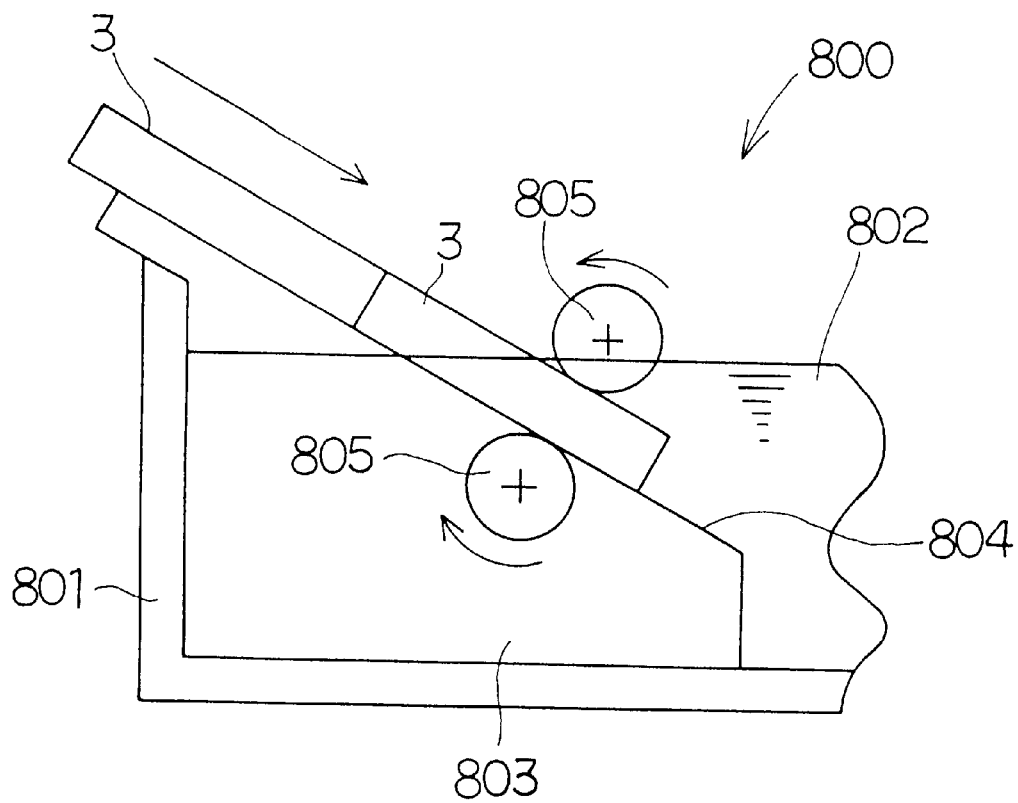
FIG. 19 is a conceptual construction view showing an electroplating device used in the invention.

This electric nickel plating M1 is applied for example as shown in FIG. 19. Specifically, into a vessel 801 containing a solution 802, a jig 803 having an inclined top face 804 is placed, a pair of ball electrodes 805, 805 are disposed near the jig 803 to form a plating device 800. The magnet 3 is put on the inclined face 804 and sent downward, held between the electrodes 805, 805 under the solution 802, and further sent lower as the electrodes rotate. The electrodes 805, 805 rotate at the fixed position, a plating electric is passed to the electrodes 805, 805, and the magnet 3 is electrically nickel plated. At the time, since the electrode position is changed on the magnet 3, the magnet 3 can be nickel plated uniformly. Furthermore, since the electrodes have the shape of a ball, they are spot contacted to the magnet, decreasing the plated film to become uneven.

The inventors have confirmed through their experiments that when the electric nickel plating is made by moving the electrodes as described above, the electroplating is substantially uniform at the center 3A and the end 3B of the permanent magnet 3 for the field without any electrode mark. In particular, the permanent magnets for the field having acute corners can be plated uniformly along the shape of the magnet material without making the corners round. This embodiment employs the nickel plating because the plated layer having a high hardness can be obtained, and is hardly abraded or scratched. But, it is to be understood that this invention is not limited to the nickel plating.

Figure 20:
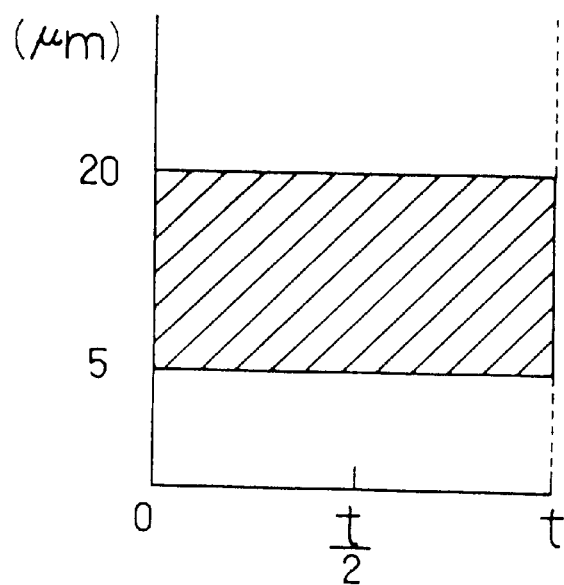
FIG. 20 is a diagram showing a thickness of the plated layer on a magnet.

In the embodiment, the plated layer is preferably 5 to 20 $\mu$m as shown in FIG. 20, and more preferably 5 to 10 $\mu$m. In FIG. 20, the horizontal axis shows an interval of a magnet in the longitudinal direction, in which t designates an end and t/2 a center. And the vertical axis shows a thickness of the plated layer.

The plating to be applied to the permanent magnets for the field is desired to be thin. If the plated layer is thick, a gap between the permanent magnet for the field and the silicon steel sheet is in creased to deteriorate the efficiency of magnetic fluxes, and the plated layer is cracked or separated due to thermal expansion and thermal stress. If the plated layer is thin, a thermal stress is small and distortion can be made small. Therefore, the plated layer is thinner, the better. But, when it is less than 5 $\mu$m, a strength against vibrations is insufficient, and if used on the motor which is used for a compressor, there is a disadvantage that the plated layer is separated in the operation range (−20 to 130° C.) of the compressor. On the other hand, when the plated layer exceeds 20 $\mu$m, it is known that the plated layer is cracked or peeled due to the thermal expansion and thermal stress. Therefore, the plated layer is desired to be 5 to 20 $\mu$m as described above. In particular, when the plated layer is 5 to 10 $\mu$m, forced cooling after installing the magnets into the compressor does not cause a crack in the plated layer. If the forced cooling is not effected, the plated layer is sufficient in 5 to 20 $\mu$m.

Figure 21:
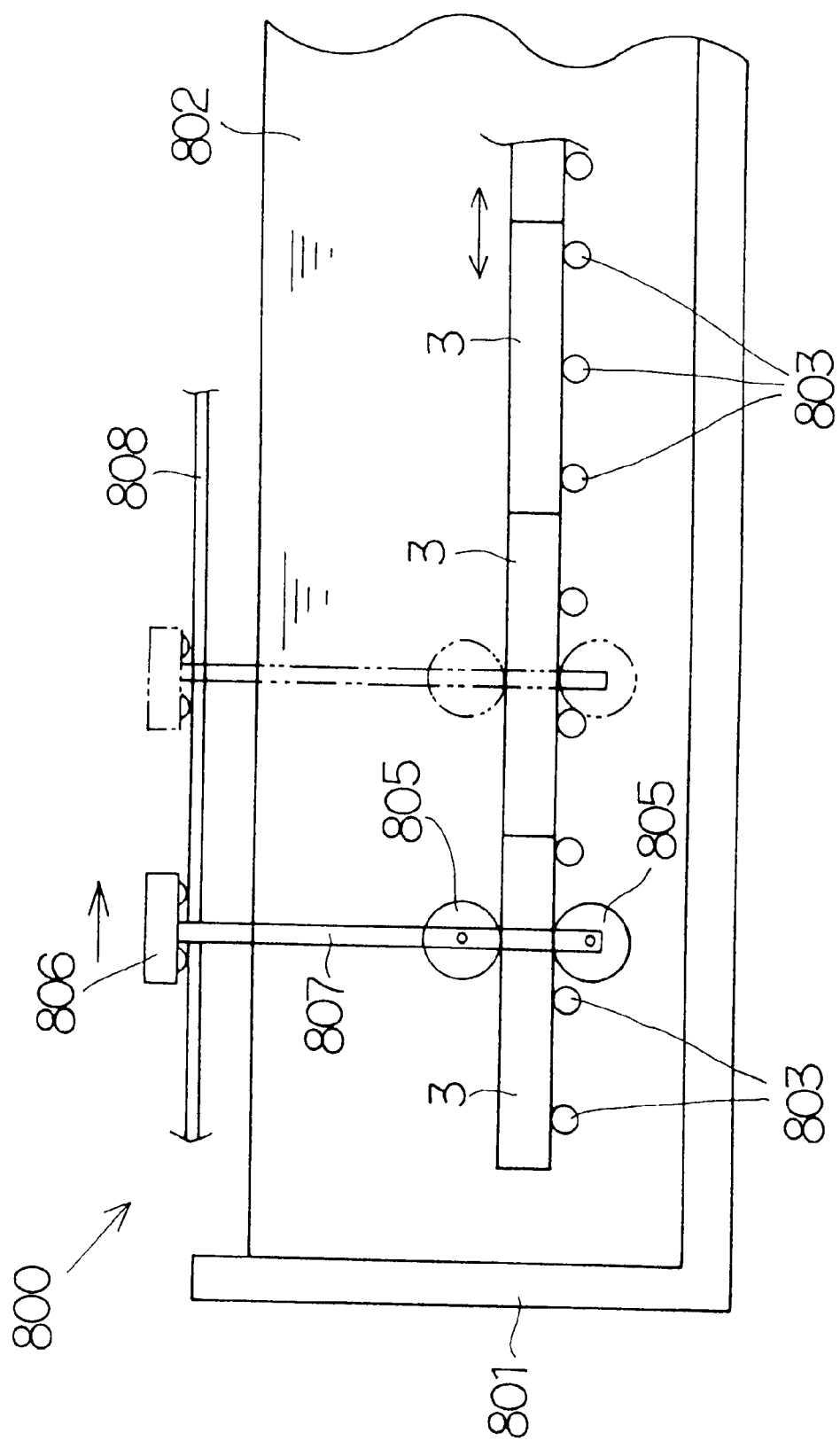
FIG. 21 is a conceptual construction view showing another electroplating device used in the invention.

FIG. 21 is a diagram showing another electroplating device used in the invention. In this case, roller jigs 803, 803 are placed in a vessel 801 which is charged with a solution 802, and a pair of roller electrodes 805, 805 which are horizontally movable along the jigs 803 are disposed to form a plating device 800. The electrodes 805, 805 are connected to a slider 806 via supporting rods 807 to be movable horizontally. The magnet 3 is dipped in the solution 802, placed on the jigs 803, 803, and held between the electrodes 805, 805. In this case, the electrodes 805, 805 are rotated and moved horizontally, then the magnet 3 is electrically nickel plated. Since the electrode positions on the magnet 3 are changed, the surfaces of the magnet 3 are uniformly nickel plated. And, when the roller jigs 803, 803 are always in contact with the magnet 3 at the same position when it is placed on them, non-plated portions are formed, so that the roller jigs 803, 803 are designed to slightly turn forward and backward directions. Thus, the magnet 3 is oscillated in right and left directions, and the positions of the electrodes 805, 805 are changed, so that the surfaces of the magnet 3 are substantially uniformly nickel plated without any electrode mark.

Figure 22:
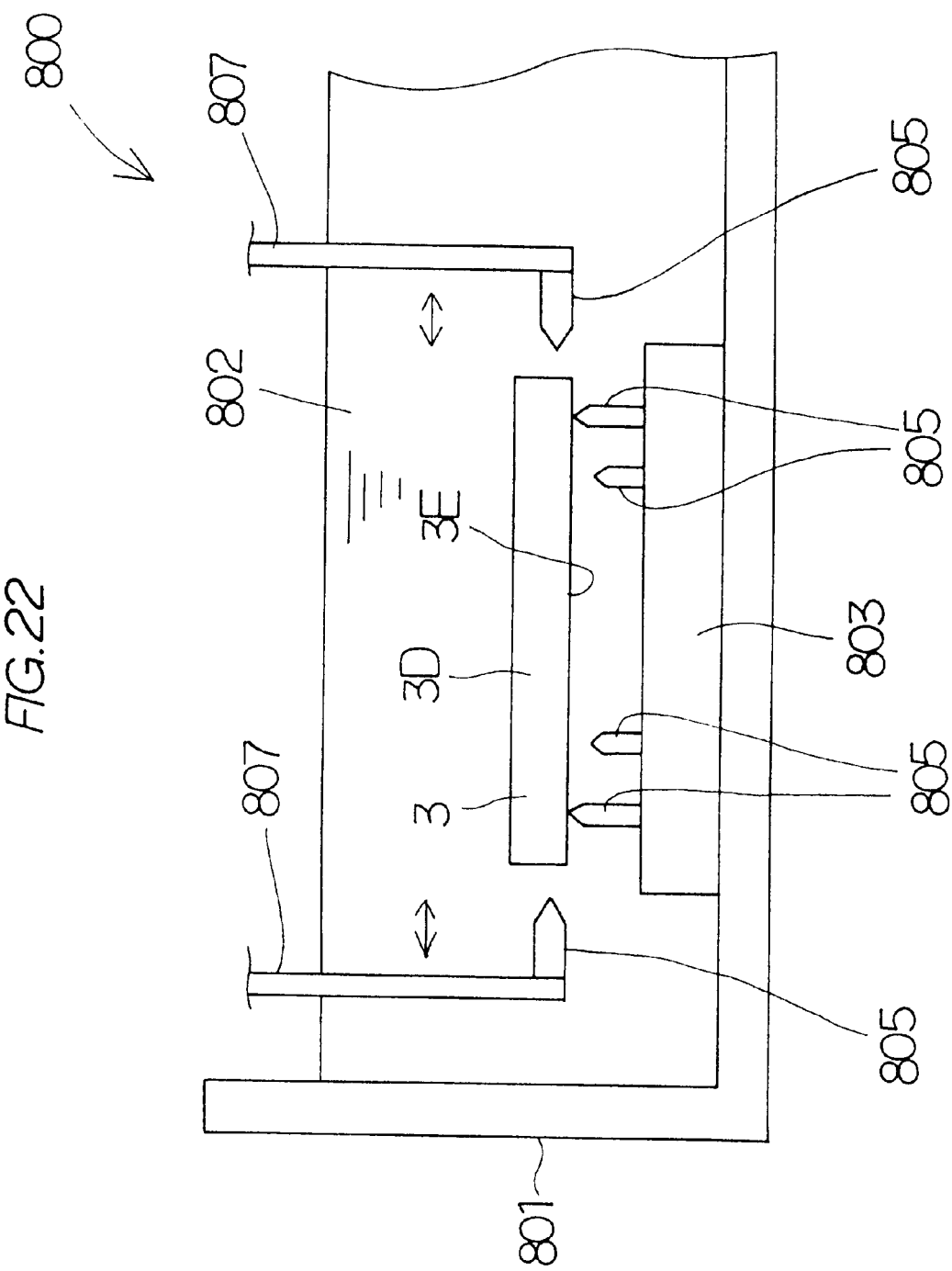
FIG. 22 is a conceptual construction view showing another electroplating device used in the invention.

FIG. 22 is a diagram showing still another electroplating device used in the invention. In this case, a jig 803 provided with a plurality of electrodes 805, 805 which are vertically movable is placed in a vessel 801 which is charged with a solution 802, and electrodes 805 are protruded from the bottoms of supporting rods 807 which are horizontally movable, thereby forming a plating device 800. The magnet 3 is dipped in the solution 802 and positioned on the jigs 803, 803. In this case, the electrodes 805 disposed on the jig 803 are in contact with a face 3E having a large area of the magnet 3. And, the electrodes 805 disposed on the supporting rods 807 are in contact with faces 3D having a small area of the magnet 3, and some of the electrodes 805, 805 are in conduction with the magnet, so that the magnet 3 is electrically nickel plated. In other words, the electrodes and the magnet are appropriately and alternately contacted and conducted, the electrode positions on the magnet 3 are changed, and the surfaces of the magnet 3 can be nickel plated uniformly.

Thus, in the present invention, since the magnet and the electrodes are relatively moved, a current to the magnet is not concentrated in the electroplating, the surfaces are plated without any electrode mark, and the center and ends of the magnet are uniformly plated. Furthermore, since the electrodes are designed to move, the permanent magnet for the field having acute corners can be plated uniformly along the shape of the magnet material without making the corners round.

Therefore, when the repaired spots for the electrodes are on the front and back faces, the lengths of the rotor yoke 2 and the magnets in the axial direction cannot be set to be same by a conventional electroplating. And, when the repaired spots for the electrodes are on the face 3E of the magnet which has a large surface area, a gap between the permanent magnet for the field and the silicon steel sheet must be increased, causing a disadvantage that the magnetic flux efficiency is deteriorated. On the other hand, in the invention, the permanent magnet 3 for the field does not have a projection such as the repaired spot for the electrode as in the prior art, so than inconvenience can be avoided and the size management can be made easily.

A permanent magnet rotor 1 assembled in this embodiment is heated for several minutes at a temperature lower between a curie point of the permanent magnet 3 for the field to a temperature for retaining the plating performance or a temperature for retaining the material performance of the permanent magnet for the field. As it is known, a ferromagnetic material such as a magnet has spontaneous magnetism, and this spontaneous magnetism is arranged by the application of external magnetic fields and magnetism is externally exhibited. But, a temperature that the spontaneous magnetism is extinguished is a curie point.

In this embodiment, the permanent magnet motor 1 is heated for several minutes between a temperature or above of the curie point of the permanent magnet for the field and a temperature below the temperature for retaining the material performance of the permanent magnet for the field, and fitted to the rotatable shaft of a refrigerating cycle compressor as described afterward.

According to the embodiment described above, a current is not concentrated onto the magnet and the surfaces are treated without any electrode mark in electroplating, and the plating can be applied uniformly to the center and to the ends. Furthermore, since the electrodes are designed to move, the permanent magnet for the field having acute corners can be plated uniformly along the shape of the magnet material without having the corners made round. In particular, since corners 3C are retained by the strength of plating itself, the permanent magnet for the field it self does not need its material strength. And, the electric nickel plating M1 has a thickness of at least 5 μm and 20 μm or below at about the center 3A of the permanent magnet for the field, and the permanent magnets 3 for the field are inserted into the rotor yoke 2, which is then shrinkage fitted at a temperature higher than the curie point of the permanent magnet for the field. Thus, the inventors have found that even when a slightly magnetized magnet is mixed, demagnetization can be made at the high temperature. And, they have also found that by applying a high temperature, binding on the interface between the plating and the permanent magnet for the field can be improved. And, they have also found the above thickness of at least 5 μm and 20 μm or below is a minimum thickness which is hard to cause a distortion or crack due to a difference in expansion coefficient between the permanent magnet for the field and the plating when the rotor is fitted to the rotatable shaft, and that the plating is prevented from being separated due to vibrations after inserting the permanent magnets for the field into the slots of the rotor yoke 2. It is particularly preferable when the plating has a thickness of 5 μm to 10 μm, and no crack is caused in the forced cooling as described above. Besides, since the electroplating is nickel plating, it is harder than the material for the magnets and has a property of soft magnetism. Thus, the magnets are hardly scratched before or after inserting into the rotor yoke and durability is improved. Even when the plating is separated after inserting the magnets, it is not easily dispersed from the surfaces of the magnet material because the plating is magnetic. Furthermore, for a rotor which has the permanent magnets for the field inserted into the slots of the rotor yoke, it is very advantageous that a magnetic gap between the slots and the permanent magnets for the field can be reduced because the electroplating is magnetic.

When a rare earth magnet is used for the permanent magnet for the field, the following embodiment serves as a reference. Specifically, after inserting rare earth permanent magnets for a field into the slots of the rotor yoke, the permanent magnet rotor 1 is heated for several minutes between a temperature higher than the curie point of the permanent magnet for the field and a temperature below the temperature for retaining the material performance of the permanent magnet for the field, the rotor 1 is fitted to the rotatable shaft, magnetized, and put at an auxiliary drying temperature (about 170° C.). On this point, it is conventionally known that the permanent magnet for the field is heated when used for a motor and demagnetized initially. But, for the rare earth magnet, when it is shrinkage fitted to the rotatable shaft of the rotor yoke, the spontaneous magnetism is eliminated (demagnetized), and through the later process of magnetization and preliminary drying, when the motor is used and exposed to a preliminary drying temperature, it is known that the aforementioned demagnetization can be avoided.

For the nickel plating, electroless nickel plating is also known in addition to the above electroplating. And, conventionally, the permanent magnets for the field undergo electroless nickel plating and are known to have been inserted into the slots of the rotor yoke. In this case, prior to inserting the nickel plated permanent magnets for the field into the rotor yoke, the nickel plating is thermally treated.

Figure 23:
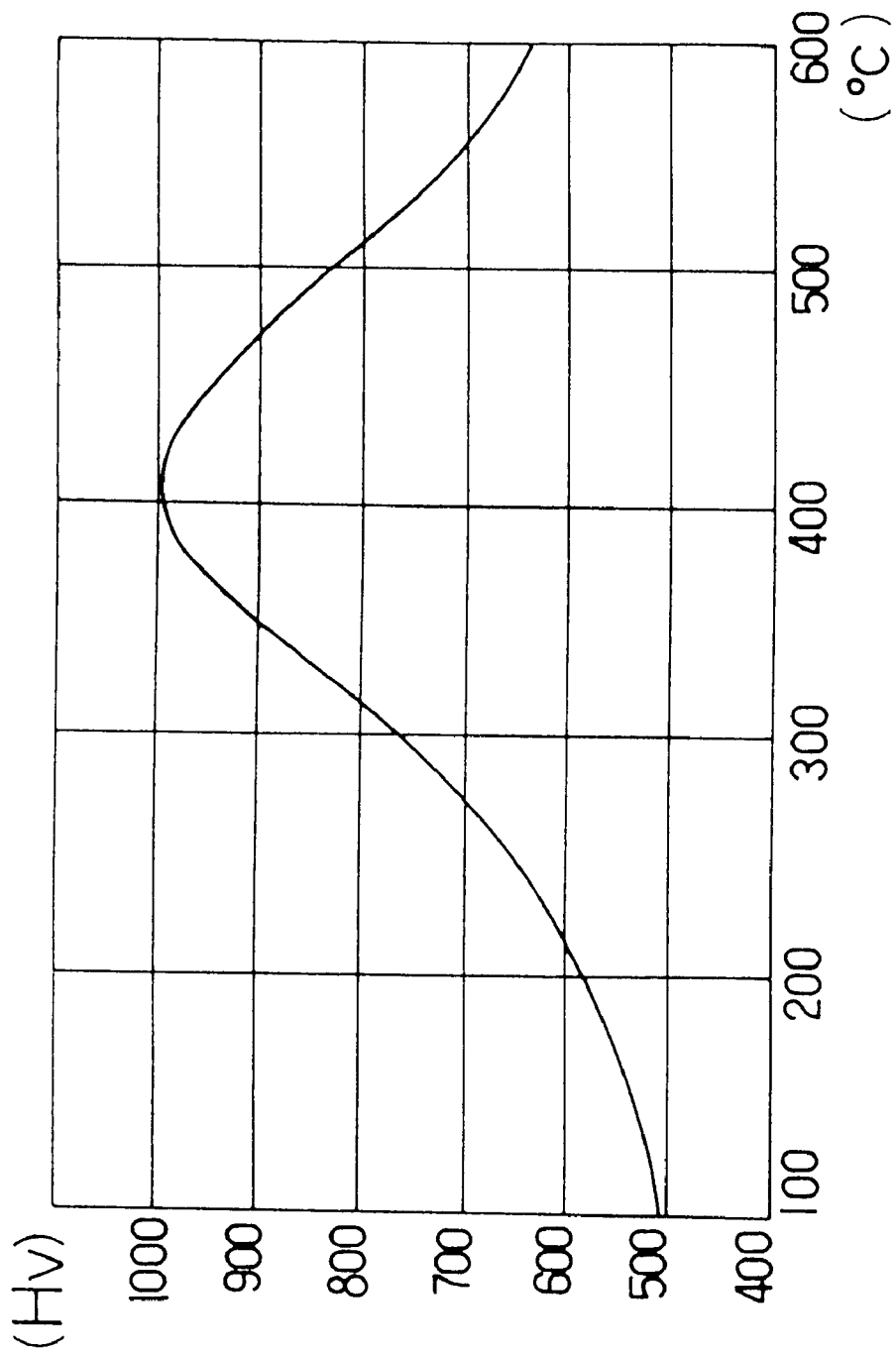
FIG. 23 is a graph showing the relation between Vickers hardness and a thermal treating temperature of electroless nickel plating.

Specifically, the plated film undergone the nickel plating is amorphous and non-magnetic, but when thermally treated, gradually crystallized at about 250° C. to produce a eutectic body of Ni3-P in addition to Ni, and magnetized. And, as shown in FIG. 23, hardness is also obtained as a peak at 400° C. But, at a still higher temperature, crystal particles which are once finely pulverized become large and hardness is lowered.

Therefore, when electroless plated permanent magnets for a field are conventionally used, they are thermally treated, the rotor yoke is shrinkage fitted to the rotatable shaft, and the permanent magnets for the field are inserted into the slots of the rotor yoke. Therefore, the process takes a long time, and the magnets are difficult to fix.

The inventors have found that the peak hardness is obtained at 350 to 400° C., and particularly at 400° C. in FIG. 23, and the rotor yoke is shrinkage fitted to the rotatable shaft at 350 to 400° C., indicating they are common at 350 to 400° C., so that they have proposed to effect the thermal treatment of the nickel plating when the rotor yoke is shrink fitted to the rotatable yoke. Thus, after inserting the electroless nickel plated permanent magnets for the field into the rotor yoke, the rotor yoke is exposed to almost the same temperature (about 400° C.) as the thermal treating temperature for the nickel plating, making it possible to simultaneously effect the thermal treatment of the nickel plating and the shrinkage fitting which were heretofore effected separately. Since the thermal treatment of the nickel plating and the shrinkage fitting are effected at the same time, the process can be simplified and its time can be made short. This embodiment has confirmed that cracks in the plating have been reduced.

Figure 24:
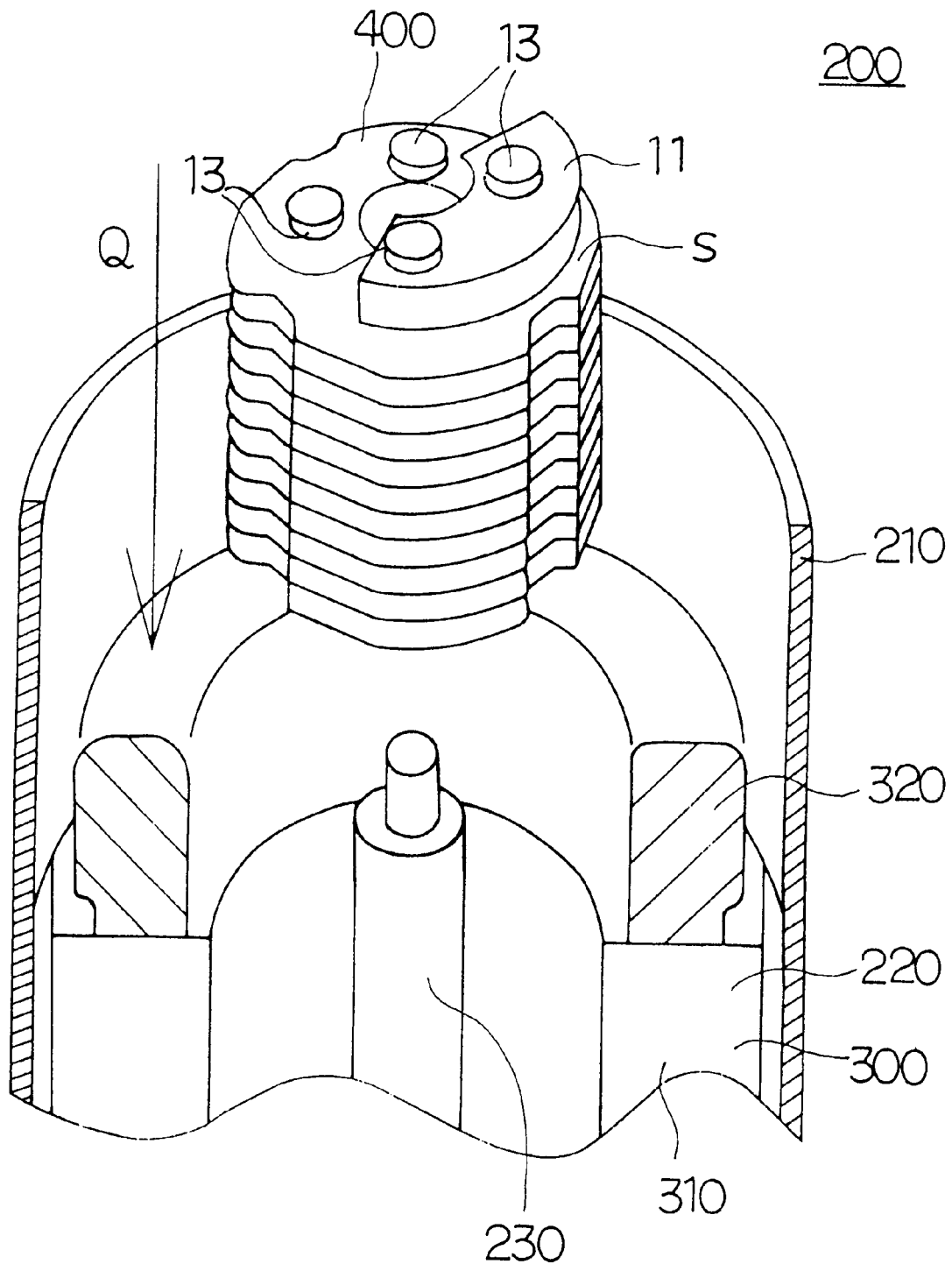
FIG. 24 is a sectional view showing to fit a rotor yoke of a permanent magnet rotor of the invention to a compressor.
Figure 25:
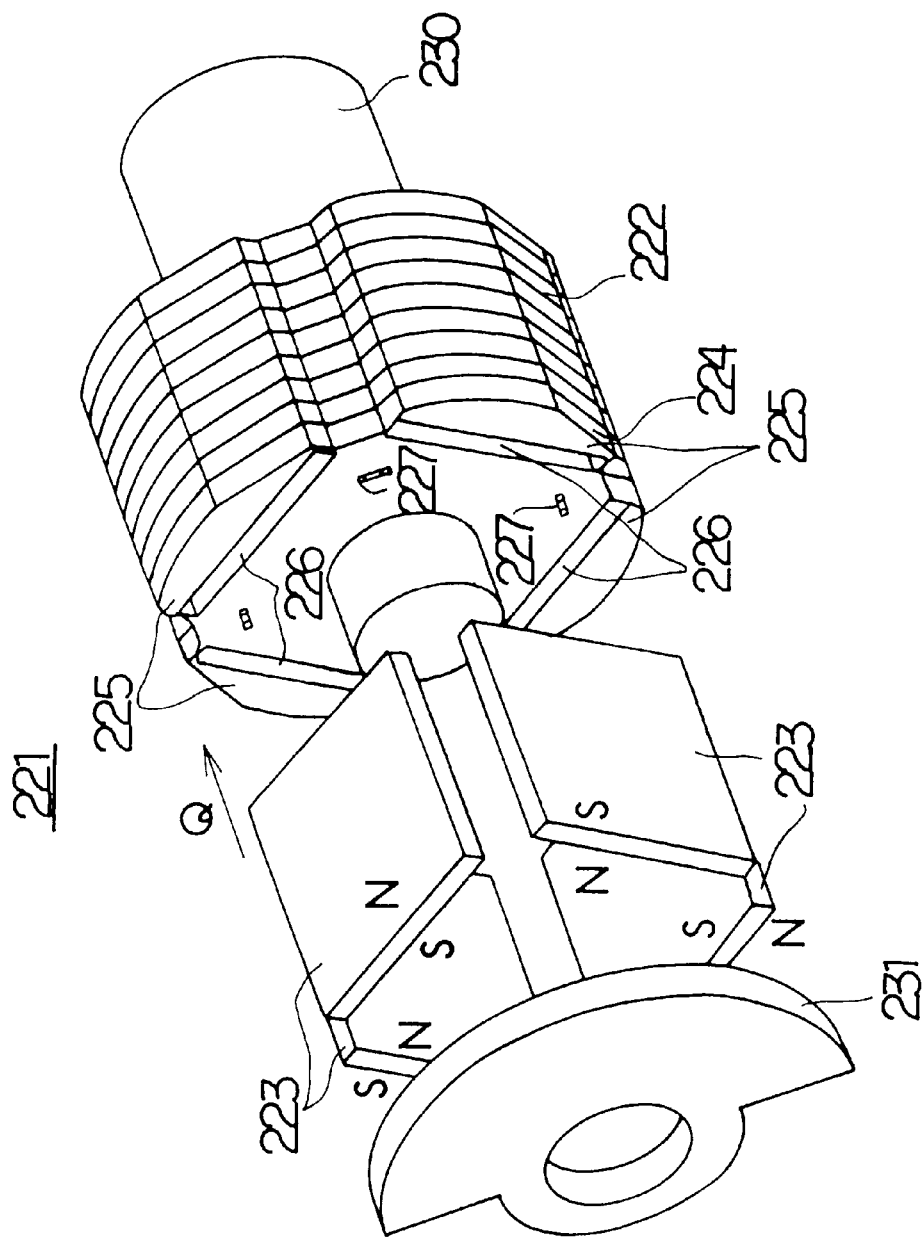
FIG. 25 is a perspective view showing a conventional permanent magnet rotor in an exploded state.
Figure 26:
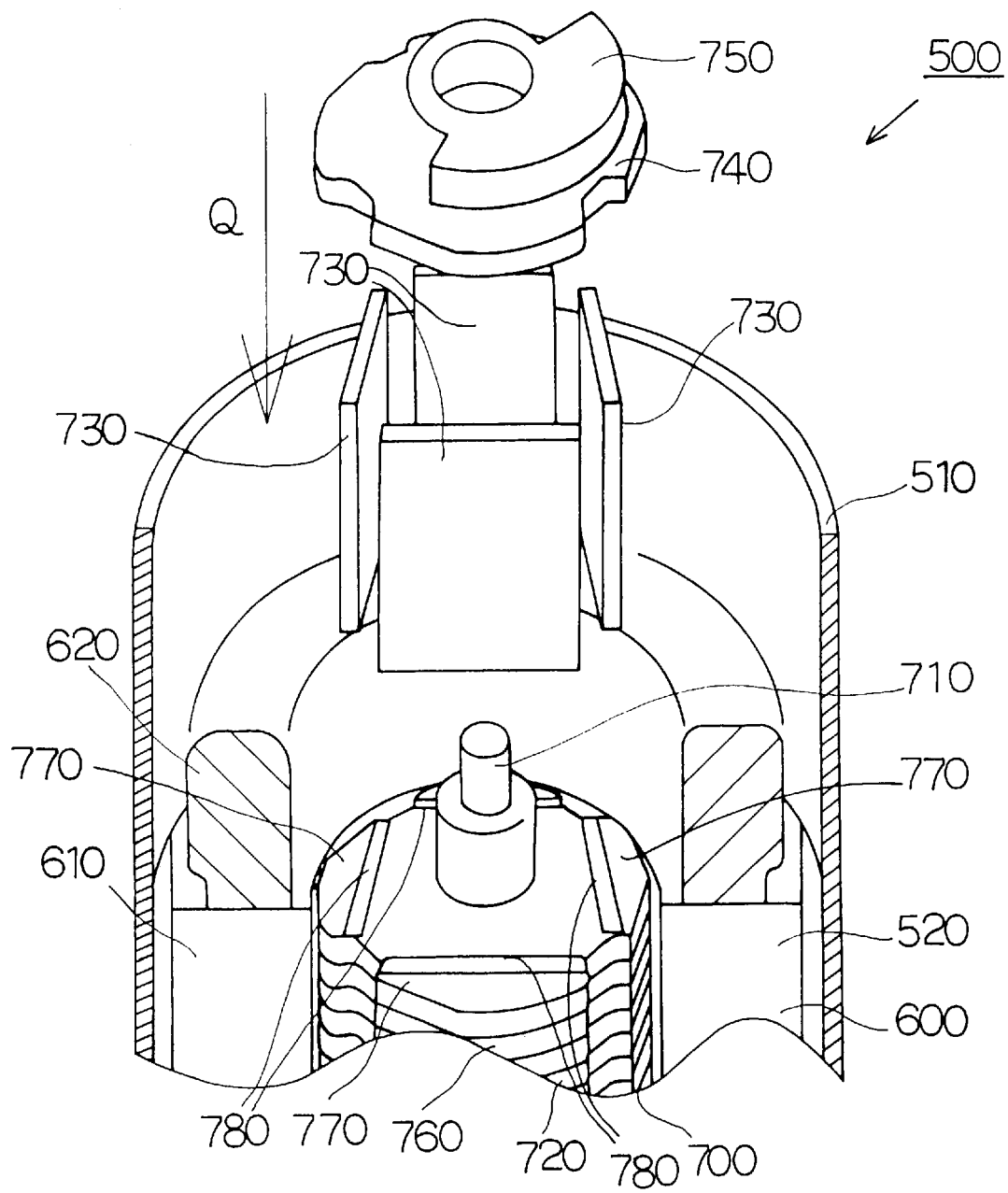
FIG. 26 is a longitudinal sectional view showing a conventional refrigerating cycle compressor.

FIG. 24 is a sectional view showing a rotor yoke being fitted to a compressor.

A refrigerating cycle compressor which is indicated as a whole by reference numeral 200 has a sealed vessel 210 in which a refrigerant flows. The vessel 210 has a compression device (not shown) and a drive motor 220 vertically disposed in series within it.

The drive motor 220 comprises a rotor 400, a stator 300 and a drive shaft 230. The stator 300 comprises a stator core 310 and an exciting coil 320. The rotor 400 includes a rotor yoke, permanent magnets for a field, a spacer s and a balance weight 11, which are caulked into one body by rivets 13.

To assemble a refrigerating cycle compressor, the rotor 400, which is heated to a curie temperature or above of the permanent magnet for the field and a temperature lower between a temperature for retaining the performance (electric nickel plating) of the material of the permanent magnet for the field and a temperature for retaining the performance (electroless nickel plating) of the plating, is fitted in direction Q to the rotatable shaft 230 disposed within the sealed vessel 210 and cooled.

Then, a lid (not shown) of the sealed vessel 210 is closed, the rotatable shaft 230 is mechanically fixed, a high current is passed through the exciting coil 320, the permanent magnets for the field are thus magnetized, and hot air is blown to dry the interior of the sealed vessel 210 to evaporate moisture.

The above construction has made it possible to separately produce by assembling the rotor (fitting of the permanent magnets for the field to the rotor yoke) and fitting the rotor to the rotatable shaft of the compressor. Thus, the production process is simplified and time is decreased.

Industrial Applicability

As described above, the invention relates to a permanent magnet rotor in which permanent magnets for a field are inserted into bases of all or every other magnet poles of a rotor yoke and to a method for producing it, and particularly to a permanent magnet rotor which prevents the permanent magnets for the field from coming out, improves safety and reliability of a permanent magnet rotor by treating the surfaces of the permanent magnets for the field, and is suitable for a motor which needs a high speed or a motor which is used in a pressure vessel in which an oil or refrigerant is flown under pressure.

Particularly, the invention relates to a permanent magnet rotor in which at least one end of the rotor is made of a steel sheet substantially same as the rotor yoke to prevent the permanent magnets for the field from coming out. Thus, a process is simplified, and a production time is shortened.

We claim:

1. A method of producing a permanent magnet rotor, comprising the steps of:

laminating a plurality of steel sheets to form a rotor yoke having 2n times (n is a positive integer) of magnetic poles on an outer periphery thereof, and a plurality of slots for receiving field permanent magnets at bases of all or every other magnetic poles at substantially equal distances from a rotatable shaft hole;

making said field permanent magnets from a rare earth material;

forming said field permanent magnets to a predetermined thickness;

electrically nickel plating said field permanent magnets such that said nickel plating provides a plated layer having a thickness between 5 $\mu$m and 20 $\mu$m at a center of said field permanent magnets and has a substantially uniform thickness at said center and ends of said field permanent magnets without any electrode mark;

disposing said plated field permanent magnets in said slots;

heating said rotor yoke at a temperature above a curie point of said permanent magnets but below a temperature for retaining performance of said rare earth material;

shrinkage fitting said heated rotor yoke to a rotatable shaft; and making magnetization of said rotor yoke.

2. A method of producing a permanent magnet rotor, comprising the steps of:

laminating a plurality of steel sheets to form a rotor yoke having 2n times (n is a positive integer) of magnetic poles on an outer periphery thereof, and a plurality of slots for receiving field permanent magnets at bases of all or every other magnetic poles at substantially equal distances from a rotatable shaft hole;

making said field permanent magnets from a rare earth material;

forming said field permanent magnets to a predetermined thickness;

treating electroless nickel plating of said field permanent magnets at a temperature between 350° C. and 400° C.;

disposing said plated field permanent magnets in said slots;

heating said rotor yoke at a substantially same temperature as that of thermal treatment of said electroless nickel plating; and shrinkage fitting said heated rotor yoke to a rotatable shaft while doing said thermal treatment of said nickel plating.

* * * * *